United States Patent
Aoki

(10) Patent No.: US 9,245,330 B2
(45) Date of Patent: Jan. 26, 2016

(54) IMAGE PROCESSING DEVICE, IMAGE PROCESSING METHOD, AND COMPUTER READABLE MEDIUM

(75) Inventor: Hiromatsu Aoki, Suita (JP)

(73) Assignee: OMRON CORPORATION, Kyoto-shi (JP)

( * ) Notice: Subject to any disclaimer, the term of this patent is extended or adjusted under 35 U.S.C. 154(b) by 149 days.

(21) Appl. No.: 14/122,503

(22) PCT Filed: Mar. 14, 2012

(86) PCT No.: PCT/JP2012/056515
§ 371 (c)(1),
(2), (4) Date: Feb. 19, 2014

(87) PCT Pub. No.: WO2012/169250
PCT Pub. Date: Dec. 13, 2012

(65) Prior Publication Data
US 2014/0185931 A1    Jul. 3, 2014

(30) Foreign Application Priority Data
Jun. 7, 2011   (JP) ................................. 2011-127754

(51) Int. Cl.
*G06T 5/00* (2006.01)
*H04N 1/62* (2006.01)
(Continued)

(52) U.S. Cl.
CPC ............ *G06T 5/008* (2013.01); *G06K 9/00234* (2013.01); *G06K 9/00248* (2013.01);
(Continued)

(58) Field of Classification Search
CPC ........... G06T 5/006; G06T 5/008; G06T 5/40; G06T 17/30265; G06K 9/00268; G06K 9/00228; G06K 9/00222; G06K 9/00287; G06K 9/00281; G06K 9/00248; G06K 9/00221; G06K 9/00288
See application file for complete search history.

(56) References Cited

U.S. PATENT DOCUMENTS 6,137,896 A * 10/2000 Chang et al. ................... 382/118
6,828,972 B2 * 12/2004 Zhang et al. ................... 345/473
(Continued)

FOREIGN PATENT DOCUMENTS

EP    1453002 A2   9/2004
JP    11-120336 A  4/1999
(Continued)

OTHER PUBLICATIONS

Cootes et al., Active appearance models. IEEE Transactions on Pattern Analysis and Machine Intelligence. Jun. 2001, vol. 23, No. 6, pp. 681-685.
(Continued)

*Primary Examiner* — Amir Alavi
(74) *Attorney, Agent, or Firm* — Nutter McClennen & Fish LLP; John J. Penny, Jr.

(57) ABSTRACT

An image processing device for performing image processing on a facial image including a mouth of a person is provided, comprising a first organ likelihood identification unit configured to identify, based on a difference between a color of a location and a first representative color which is a representative color of an organ to be processed, a likelihood of the location being the organ as a first organ likelihood for each location of a first region including at least a part of the mouth; a first weight determination unit configured to determine a first weight which becomes smaller the greater a distance from a first location of the first region for each location; a correction degree determination unit configured to determine a correction degree of the location which becomes greater the greater the first organ likelihood and the first weight; and an image correction unit configured to correct an image.

20 Claims, 26 Drawing Sheets

(51) Int. Cl.
 *G06T 5/40* (2006.01)
 *G06K 9/00* (2006.01)

(52) U.S. Cl.
 CPC . *G06T 5/40* (2013.01); *H04N 1/62* (2013.01); *G06T 2207/10024* (2013.01); *G06T 2207/30201* (2013.01); *H04N 1/628* (2013.01)

(56) References Cited

U.S. PATENT DOCUMENTS

| | | | |
|---|---|---|---|
| 7,460,707 B2 * | 12/2008 | Nishi | 382/167 |
| 7,519,219 B2 * | 4/2009 | Okamura | 382/167 |
| 7,606,397 B2 * | 10/2009 | Kowald | 382/118 |
| 7,643,671 B2 * | 1/2010 | Dong et al. | 382/154 |
| 8,045,014 B2 * | 10/2011 | Fujiwara et al. | 348/223.1 |
| 8,244,059 B2 * | 8/2012 | Ueda | 382/275 |
| 8,310,726 B2 * | 11/2012 | Enjuji | 358/3.01 |
| 8,441,544 B2 * | 5/2013 | Minagawa et al. | 348/222.1 |
| 8,917,949 B2 * | 12/2014 | Shirata | 382/254 |
| 2007/0274573 A1 | 11/2007 | Hori | |
| 2009/0185049 A1 | 7/2009 | Takahashi | |
| 2013/0343647 A1 | 12/2013 | Aoki | |
| 2014/0185931 A1 * | 7/2014 | Aoki | 382/167 |

FOREIGN PATENT DOCUMENTS

| | | |
|---|---|---|
| JP | 2005-276182 A | 10/2005 |
| JP | 2009-231879 A | 10/2009 |
| JP | 4831259 B1 | 12/2011 |

OTHER PUBLICATIONS

International Search Report for Application No. PCT/JP2012/056515 mailed May 29, 2012 (3 Pages).

Extended European Search Report for Application No. 12797180.2, issued Nov. 6, 2014 (10 pages).

* cited by examiner

Normalized image

Smoothed image

Wc

D1

Wd

D2

Width of lip

Center ⟷ End

Pixel where product of luminance and D3 is maximum

Gloss image

Before correction

After correction

Smoothed region (smoothing)

Region in which gloss is enhanced
(luminance is increased)

Cb image

Cr image

Wh

Wi

1−We

1−Wf

Teeth gloss image
(correction degree)

IMAGE PROCESSING DEVICE, IMAGE PROCESSING METHOD, AND COMPUTER READABLE MEDIUM

This application is a 371 PCT/JP2012/056515 filed on Mar. 14, 2012.

CROSS-REFERENCE TO RELATED APPLICATION(S)

This application claims the benefit of priority from Japanese Patent Application No. 2011-127754, filed on 7 Jun. 2011, and International Application No. PCT/JP2012/056515, filed on 14 Mar. 2012 and designating the United States, the entire contents of which is incorporated herein by reference for all purposes.

BACKGROUND

The present invention relates to image processing devices and image processing methods, and in particular, to an image processing device and an image processing method for performing correction of a facial image.

When an image such as a photograph, a video, or the like includes a person's face, the face in the image is often the portion that attracts the attention of a person observing the image. A technique for correcting or adjusting the facial image to improve the appearance of the face included in the image is conventionally known.

For example, patent document 1 (Japanese Unexamined Patent Publication No. 2009-231879, published Oct. 8, 2009) discloses a technique of extracting contours of the upper and lower lips, identifying the portion surrounded by the detected contours on the inner side of the upper and lower lips as the portion corresponding to the teeth, and adjusting the brightness of the portion corresponding to the teeth. For example, the pixel values of the portion corresponding to the teeth are made light to improve the appearance of the face. In the technique of patent document 1, the contour of the lip is detected from the change in the luminance value of each pixel of the image to identify the portion corresponding to the teeth. Specifically, a plurality of detection lines in a vertical direction (height direction of the face) is defined in the mouth region, the change in the luminance value of the pixel is examined along each detection line, and the point where the change in the luminance value is relatively large is identified as the contour point of the lip. The contour points corresponding to the contour on the outer side and the contour on the inner side of the upper and lower lips are identified from a spatial distribution of the identified contour points, the region surrounded by the contour on the inner side of the upper and lower lips is identified as the inside of the mouth, and the region corresponding to the teeth is assumed to exist thereat. If a histogram for the luminance values in the region inside the mouth is created, many hills appear. According to patent document 1, the pixel having a luminance greater than a local minimal value of the histogram closest to the maximum luminance value is assumed as the tooth.

However, the conventional configuration described above has the following problems.

Consideration is made to first detect the contour of the lip to identify the region to correct the lip or the teeth. However, a facial image with satisfactory illumination condition needs to be prepared to detect the contour of the lip using the technique of patent document 1. The luminance value of the image greatly changes depending on the photographing environment such as illumination, and the like. For example, in the facial image photographed under a backlight condition, the light does not shine on the portion of the face and the entire face becomes dark. Thus, the change in the luminance value for every pixel becomes small, the change in the luminance value of the contour portion of the lip also becomes small, and a problem that the identification of the contour point becomes difficult (erroneous detection tends to easily occur) arises. Furthermore, when photographed under low illumination intensity such as indoor and the like, the noise becomes relatively large and the identification of the contour point of the lip becomes more difficult.

When photographed under the illumination condition in which light shines on the face, the change in the luminance value of the contour portion of the lip becomes large and the contour point can be easily identified. However, shadow may form by the bumps of the face depending on the manner the light shines on the face, where change in luminance greater than the change in the luminance value at the contour of the lip may occur at the boundary portion of the shadow. As a result, distinction between the boundary of the shadow and the contour of the lip becomes difficult.

When photographed under the illumination condition in which light strongly shines on the face, the entire face appears whitish (luminance is large). Thus, the vicinity of the contour of the lip becomes whitish, the change in the luminance value of the contour portion becomes small, and the identification of the contour point becomes difficult. If a great change in luminance occurs at the boundary of the shiny region due to the reflection (shine) of the light hitting the lipstick or lip gloss, the distinction between the contour and the boundary of the shine becomes difficult and erroneous detection tends to easily occur.

In the technique of patent document 1, the pixel, whose luminance is greater than a certain value in the oral region identified from the contour of the lip, is identified as the correction target, and tone curve is uniformly applied on the pixel to be corrected to increase the luminance. In this case, the boundary of the region determined as the correction target and the other regions may appear unnaturally emphasized due to the correction of increasing the luminance.

In light of the foregoing, it is an object of at least one embodiment of the present invention to realize image processing for appropriately performing the correction on the organ to be processed such that the boundary of the region to be processed is not unnaturally emphasized.

SUMMARY

An image processing device according to at least one embodiment of the present invention relates to an image processing device for performing image processing on a facial image including a mouth of a person, the image processing device comprising a first organ likelihood identification unit configured to identify, based on a difference between a color of a location and a first representative color which is a representative color of an organ to be processed, a likelihood of the location being the organ as a first organ likelihood for each location of a first region including at least a part of the mouth of the facial image; a first weight determination unit configured to determine a first weight so that the first weight becomes smaller the greater a distance from a first location of the first region for each location of the first region; a correction degree determination unit configured to determine a correction degree of the location so that the correction degree becomes greater the greater the first organ likelihood and the first weight; and an image correction unit configured to correct an image using the correction degree.

An image processing method according to at least one embodiment of the present invention relates to an image processing method for a facial image including a mouth of a person, the image processing method comprising steps of identifying, based on a difference between a color of a location and a first representative color which is a representative color of an organ to be processed, a likelihood of the location being the organ as a first organ likelihood for each location of a first region including at least a part of the mouth of the facial image; determining a first weight so that the first weight becomes smaller the greater a distance from a first location of the first region for each location of the first region; determining a correction degree of the location so that the correction degree becomes greater the greater the first organ likelihood and the first weight; and correcting an image using the correction degree.

DETAILED DESCRIPTION

Hereinafter, an image processing device, mounted on a digital camera, for performing processes on a facial image included in an imaged image will be mainly described, but the present invention is not limited thereto. For example, the image processing device according to at least one embodiment of the present invention may be mounted on a photographing device such as a digital video camera, a Web camera of a personal computer (PC), a portable telephone with a camera, and the like to perform processes on the image obtained by photographing with the photographing device. The image processing device according to at least one embodiment of the present invention may perform processes on the image acquired from a communication path such as a network, and the like, or an external storage device. The processes may be performed on the facial image of not only an imaged still image but also a moving image, and the like. The processes may be performed on a preview image displayed on a display device of the digital camera when imaging with the digital camera.

An embodiment of the present invention will be hereinafter described in detail with reference to the drawings.

<Configuration of Digital Camera>

Figure 2:
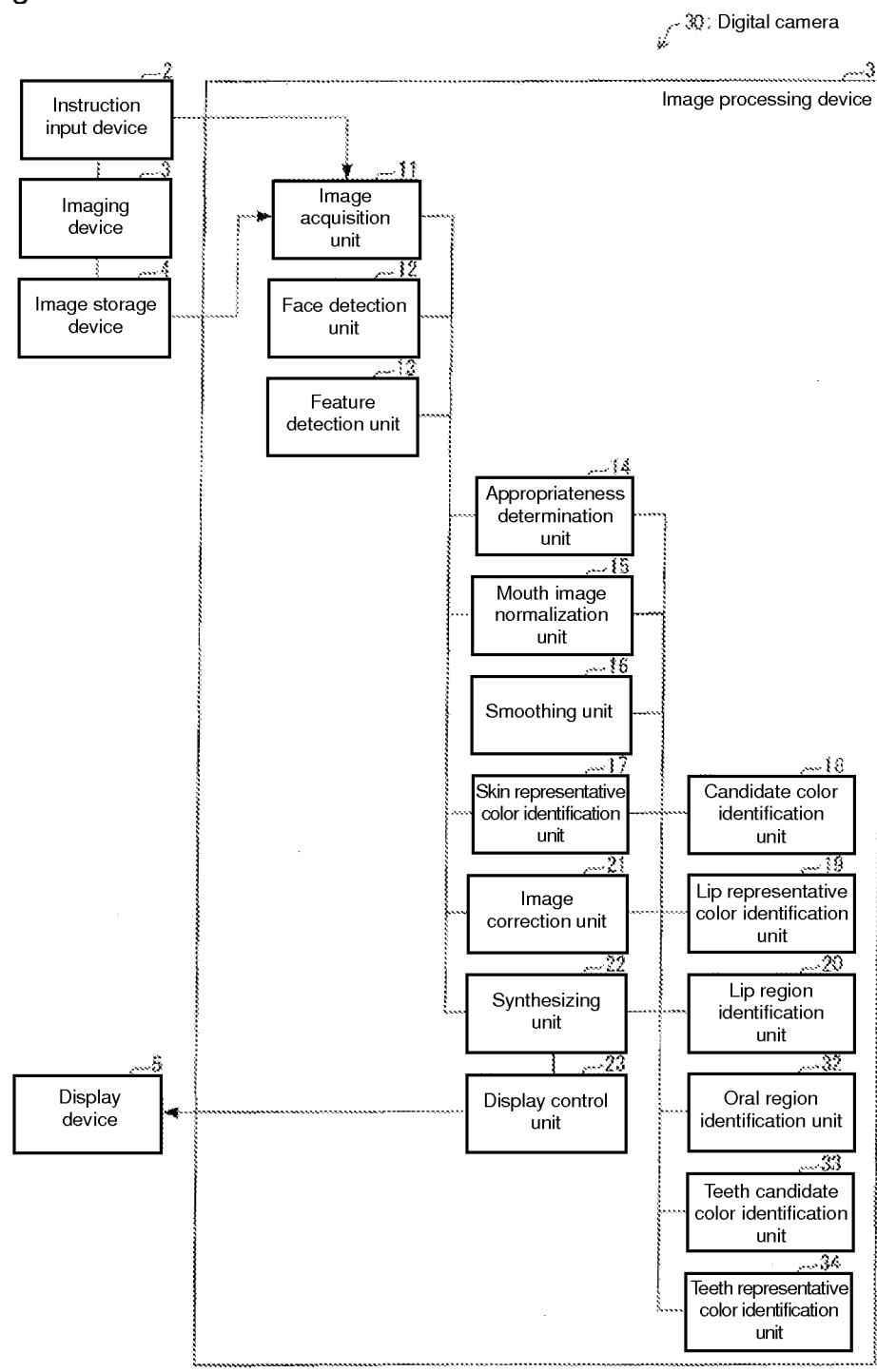
FIG. 2 is a block diagram showing a schematic configuration of a digital camera according to one embodiment of the present invention.

FIG. 2 is a block diagram showing a schematic configuration of a digital camera 30 according to the embodiment. The digital camera 30 includes an instruction input device 2, an imaging device 3, an image storage device 4, a display device 5, and an image processing device 31.

The instruction input device 2 includes an input device such as a button, a key, or a touch panel, and receives the instruction for imaging from a user and outputs the instruction for imaging to the imaging device 3. The instruction input device 2 also receives an instruction for correction process of the facial image from the user, and outputs the instruction for correction process to the image processing device 31.

The imaging device 3 includes, for example, an imaging element such as a CCD (Charge Coupled Device), a CMOS (Complementary Metal Oxide Semiconductor) imaging element, and the like. The imaging device 3 performs imaging in response to the instruction for imaging, and outputs the imaged image (image data) to the image storage device 4.

The image storage device 4 stores various types of information, and includes a storage device such as a HDD (Hard Disk Drive), a flash memory, and the like, for example. The image storage device 4 stores and saves the image received from the imaging device 3.

The display device 5 includes a display, and displays the input image to present to the user. The display device 5 also receives the image performed with the correction process from the image processing device 31, and displays such image performed with the correction process.

<Configuration of Image Processing Device>

The image processing device 31 includes an image acquisition unit (instruction receiving unit) 11, a face detection unit 12, a feature detection unit 13, an appropriateness determination unit 14, a mouth image normalization unit 15, a smoothing unit 16, a skin representative color identification unit 17, a candidate color identification unit 18, a lip representative color identification unit 19, a lip region identification unit 20, an image correction unit 21, a synthesizing unit 22, a display control unit 23, an oral region identification unit 32, a teeth candidate color identification unit 33, and a teeth representative color identification unit 34.

The image acquisition unit 11 receives an instruction for correction process from the instruction input device 2. The instruction for correction process includes information indicating the image to be processed and information on what kind of correction process to perform. The type of correction process includes, for example, lip shine emphasizing correction of correcting the image as if lip gloss is applied to the lip, whitening correction of the teeth of correcting the image so that the teeth appears white, and the like. The image acquisition unit 11 acquires the image to be processed from the image storage device 4 on the basis of the received instruction for correction process. The image acquisition unit 11 may directly receive the imaged image from the imaging device 3. The image acquisition unit 11 outputs the acquired image to be processed to the face detection unit 12, the feature detection unit 13, the appropriateness determination unit 14, the mouth image normalization unit 15, the skin representative color identification unit 17, and the synthesizing unit 22. The image acquisition unit 11 also outputs the received instruction for correction process to the image correction unit 21.

The face detection unit 12 detects the facial image in the image received from the image acquisition unit 11. The face detection unit 12 identifies the location of the facial image when detecting the facial image included in the image. The location of the facial image may indicate the coordinate of a predetermined point of the facial image or may indicate the region of the facial image. The face detection unit 12 outputs the location of the facial image to the feature detection unit 13, the appropriateness determination unit 14, the mouth image normalization unit 15, and the skin representative color identification unit 17. The face detection unit 12 may detect a plurality of facial images from the image to be processed. When detecting a plurality of facial images, the face detection unit 12 may identify the location of each facial image, and output the locations of the plurality of facial images to each unit described above.

The feature detection unit 13 detects the location of each feature of the face in the facial image from the image to be processed received from the image acquisition unit 11 and the location of the facial image received from the face detection unit 12. Specifically, the feature detection unit 13 detects, for example, the features of the organs of the face such as the eye (inner corner, tail, etc.) the mouth (mouth end point, center point of mouth, etc.), the nose (top of nose, etc.), and the like and the features (feature points) of the contour, and the like of the face, and identifies the locations thereof. The location of the feature may indicate the coordinate of the feature point or may indicate the region including the feature. Each feature can be detected using a known technique. The feature detection unit 13 outputs the location of the detected feature of the face to the appropriateness determination unit 14, the mouth image normalization unit 15, the skin representative color identification unit 17, and the image correction unit 21. The feature detection unit 13 may identify the locations of the features of the plurality of facial images, and output the locations of the features of the plurality of facial images to each unit described above.

The appropriateness determination unit 14 determines whether or not the facial image is suited for performing the correction process from the image to be processed received from the image acquisition unit 11, the location of the facial image received from the face detection unit 12, and the location of the feature of the face received from the feature detection unit 13. For example, the appropriateness determination unit 14 determines the facial image facing the side, the facial image in which the photogenicity of the face is too small, and the like as inappropriate. Specific determination method will be described later. If the image to be processed includes a plurality of facial images, the appropriateness determination unit 14 may determine the appropriateness of performing the correction process for each facial image or may identify a predetermined number (e.g., one) of facial images more suited for performing the correction process. The appropriateness determination unit 14 outputs the information indicating the facial image determined as appropriate for the processing target to the mouth image normalization unit 15, the skin representative color identification unit 17, and the candidate color identification unit 18.

The mouth image normalization unit 15 receives the image to be processed, the location of the facial image, and the location of the feature of the face from the image acquisition unit 11, the face detection unit 12, and the feature detection unit 13. Based on the received information, the mouth image normalization unit 15 extracts the image of the mouth region of the facial image to be processed for the facial image determined as appropriate for the processing target by the appropriateness determination unit 14. In order to facilitate the calculation in the subsequent image processing, the mouth image normalization unit 15 normalizes the image size such that the mouth region of the image to be processed becomes a predetermined size. Specifically, the mouth image normalization unit 15 rotates and enlarges/reduces the facial image to be processed, as necessary, so that the left and right end points of the mouth are located at predetermined coordinates, and crops the mouth region (region including the mouth) of a predetermined size from the facial image to be processed. FIG. 3(*a*) is an image showing a normalized image of the mouth region. When enlarging/reducing the facial image to be processed, the pixel value of the point between the original pixels may be interpolated with an arbitrary method, as necessary. The mouth image normalization unit 15 outputs the normalized image (mouth image) of the mouth region to the smoothing unit 16, and the image correction unit 21.

The smoothing unit 16 smoothes the mouth image received from the mouth image normalization unit 15. Specifically, the smoothing unit 16 applies Gaussian filter, and the like to the mouth image to generate a smoothed mouth image. FIG. 3(*b*) is an image showing an image of the smoothed mouth region. With the use of the smoothed mouth image, the noise can be eliminated, and the desired region such as the lip can be accurately identified. The normalized mouth image and the smoothed mouth image are color images, where light and dark by the luminance value (Y value) are shown in FIGS. 3(*a*) and 3(*b*). The smoothing unit 16 outputs the smoothed mouth image to the candidate color identification unit 18, the lip region identification unit 20, and the image correction unit 21.

The skin representative color identification unit 17 receives the image to be processed, the location of the facial image, and the location of the feature of the face from the image acquisition unit 11, the face detection unit 12, and the feature detection unit 13, respectively. Based on the received information, the skin representative color identification unit 17 identifies the representative color of the skin of the facial image to be processed for the facial image determined as appropriate for the processing target by the appropriateness determination unit 14. The color of one part of the face region, for example, the average color, the color of the median value or the most frequent value, and the like of the center portion (around the nose) of the face region may be adopted as the representative color of the skin. The average color, and the like of the entire face region may be adopted as the representative color of the skin. The average color of the region including the face may be obtained, the pixel in which the hue differs from the average color in the region (angle with the average color in the CbCr plane is greater than a threshold value) and/or the pixel in which the difference in color with the average color in the region is large (distance from the average color in the YCbCr color space is greater than a threshold value) may be excluded, and the average color calculated from the remaining pixels may be adopted as the representative color. The skin representative color identification unit 17 obtains the dispersion extent of the color of the skin. The skin representative color identification unit 17 outputs the representative color of the skin to the candidate color identification unit 18 and the lip representative color identification unit 19. The skin representative color identification unit 17 outputs the dispersion extent of the color of the skin to the lip representative color identification unit 19.

Figure 4:
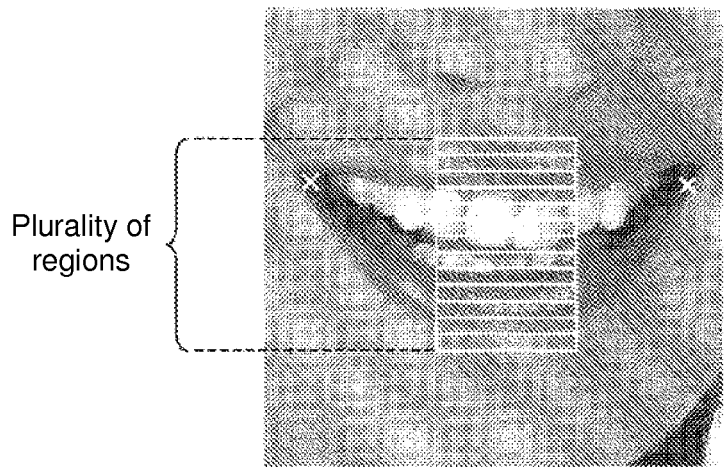
FIG. 4 is a view showing a plurality of regions in the mouth image.

The candidate color identification unit 18 identifies a plurality of candidate colors to become the candidates for the color of the lip. The candidate color identification unit 18 sets a plurality of regions in the mouth image, and identifies the representative color of each region as the candidate color. FIG. 4 is a view showing a plurality of regions in the mouth image. The x mark in the figure indicates the mouth end points detected by the feature detection unit 13. Specifically, the candidate color identification unit 18 performs the following process. The candidate color identification unit 18 divides a predetermined region at the middle in the horizontal direction of the mouth image into a plurality of regions lined in the longitudinal (vertical) direction. The candidate color identification unit 18 identifies the representative color (average color, color of median value, most frequent value, etc.) of each divided region as a plurality of candidate colors for the color of the lip. At least one of the regions divided in such manner is assumed to be a region mainly including a portion that is the lip. Thus, at least one of the plurality of candidate colors is assumed to be suited for the representative color of the color of the lip. The setting (dividing) method of each region is not limited to the above, and a plurality of regions merely needs to be set between two mouth end points where the lip is assumed to exist. The size of the plurality of divided regions is not limited, and each pixel may be the plurality of regions. The candidate color identification unit 18 identifies the candidate color using the smoothed mouth image to exclude noise, and the like of the image and identify the candidate color. However, it is not limited thereto, and the candidate color identification unit 18 may identify the candidate color using the non-smoothed mouth image. The candidate color identification unit 18 obtains the dispersion extent of the color of the divided region as the dispersion extent of the corresponding candidate color. The candidate color identification unit 18 outputs the plurality of candidate colors to the lip representative color identification unit 19. The candidate color identification unit 18 outputs the dispersion extent of the candidate color to the lip representative color identification unit 19.

The lip representative color identification unit 19 identifies the representative color of the lip from the plurality of candidate colors based on the representative color of the skin. The lip representative color identification unit 19 identifies, according to the difference in hue and chroma between the representative color of the skin and each candidate color, the candidate color in which the difference with the representative color of the skin is large as the representative color of the lip. The lip representative color identification unit 19 performs the process in the color space that expresses color by the luminance (or brightness) and the hue and chroma such as the YCbCr color space or the L*a*b* color space. The lip representative color identification unit 19 obtains an extent of being the color of the lip for each candidate color based on the information of the CbCr plane (hue-chroma plane) representing hue and chroma in the color space without using the information of the luminance (or brightness), and identifies the representative color of the lip in the CbCr plane. The detailed process for identifying the representative color of the lip will be described later. The lip representative color identification unit 19 outputs the identified representative color of the lip in the CbCr plane to the lip region identification unit 20 and the image correction unit 21.

Figure 5:
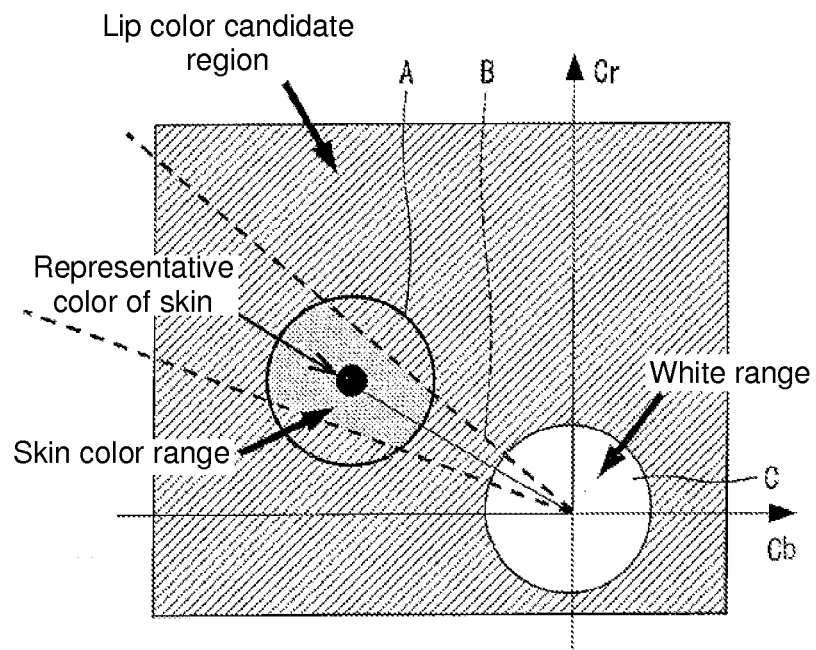
FIG. 5 is a view showing a range of colors to become the candidates for the lip color in a simplified manner in the CbCr plane.

FIG. 5 is a view showing a range of colors to become the candidates for the lip color in a simplified manner in the CbCr plane. The color of the lip is assumed to be a color that is different from the representative color of the skin to certain extent. Thus, the color of a range A, in which distance from the representative color of the skin is close, is to be excluded from the candidate of the lip color in the CbCr plane. The color of the lip is assumed to have a different hue from the representative color of the skin. Thus, the color of a range B, in which hue is close to the representative color of the skin, is to be excluded from the candidate of the lip color in the CbCr plane. If the mouth of the subject is opened and the mouth image includes teeth, the plurality of candidate colors may possibly include a whitish color that indicates the color of the teeth. In order to exclude the color of the teeth from the candidates of the lip, the color of a range C having small chroma is to be excluded from the candidates of the lip color. The candidates of the lip color are assumed to be in a range on the outer side of the range A, the range B, and the range C. In FIG. 5, the range, in which distance from the representative color of the skin is close and in which hue is close to the representative color, is assumed as the skin color range, the range with small chroma is assumed as the white range, and the range that is not the skin color range nor the white range is assumed as the lip color candidate range.

The lip region identification unit 20 identifies the region that is the lip in the mouth image based on the smoothed mouth image and the representative color of the lip. The lip region identification unit 20 identifies the region of the color similar to the representative color of the lip as the lip region according to the difference in hue and chroma with the representative color of the lip in the CbCr plane. The detailed process for identifying the lip region will be described later. The lip region identification unit 20 identifies the lip region using the smoothed mouth image to exclude noise, and the like of the image and identify the lip region. However, it is not limited thereto, and the lip region identification unit 20 may use the non-smoothed mouth image. The lip region identification unit 20 outputs the information indicating the identified lip region, the information indicating the lip candidate region, and the like to the image correction unit 21.

The oral region identification unit 32 receives the information indicating the lip region from the lip region identification unit 20, and identifies the region between the upper lip region and the lower lip region identified by the lip region identification unit 20 as the oral region. The lip region identification unit 20 can identify the region inside the mouth including the teeth in the mouth image by accurately identifying the upper and lower lip regions. If there is no space between the upper and lower lip regions, the correction of the teeth is not carried out. The oral region identification unit 32 outputs the information indicating the identified oral region to the teeth candidate color identification unit 33.

The teeth candidate color identification unit 33 identifies a plurality of teeth candidate colors to become the candidates for the color of the tooth based on the information indicating the oral region and the smoothed mouth image received from the smoothing unit 16. The teeth candidate color identification unit 33 identifies the representative color of each region from the plurality of regions included in the oral region of the mouth image, and assumes the same as the teeth candidate color. For example, the teeth candidate color identification unit 33 divides the mouth image into a plurality of regions as shown in FIG. 4. The representative color (average color, color of median value or most frequent value, etc.) of each region included in the oral region is identified as a plurality of candidate colors (teeth candidate colors) for the color of the teeth. At least one of the regions divided in such manner is assumed to be a region mainly including the teeth. The plurality of teeth candidate colors is expected to include a color suited for the representative color of the color of the teeth. However, the setting (dividing) method of each region is not limited to the above. The size of the plurality of divided regions is not limited, and each pixel may be the plurality of regions. The teeth candidate color identification unit 33 identifies the teeth candidate color using the smoothed mouth image to exclude the noise, and the like of the image and identify the teeth candidate color. However, it is not limited thereto, and the teeth candidate color identification unit 33 may identify the teeth candidate color using the non-smoothed mouth image. The teeth candidate color identification unit 33 obtains the dispersion extent of the color of the divided region as the dispersion extent of the corresponding teeth candidate color. The teeth candidate color identification unit 33 outputs the plurality of teeth candidate colors and the dispersion extent of the teeth candidate colors to the teeth representative color identification unit 34. The teeth candidate color identification unit 33 outputs the dispersion extent of the teeth candidate color to the image correction unit 21.

The teeth representative color identification unit 34 identifies the representative color of the teeth in which the extent of the color of the teeth is large from the plurality of teeth candidate colors. Specifically, the teeth representative color identification unit 34 identifies the teeth candidate color having the smallest chroma as the representative color of the teeth. The teeth representative color identification unit 34 outputs the representative color of the teeth to the image correction unit 21.

Figure 1:
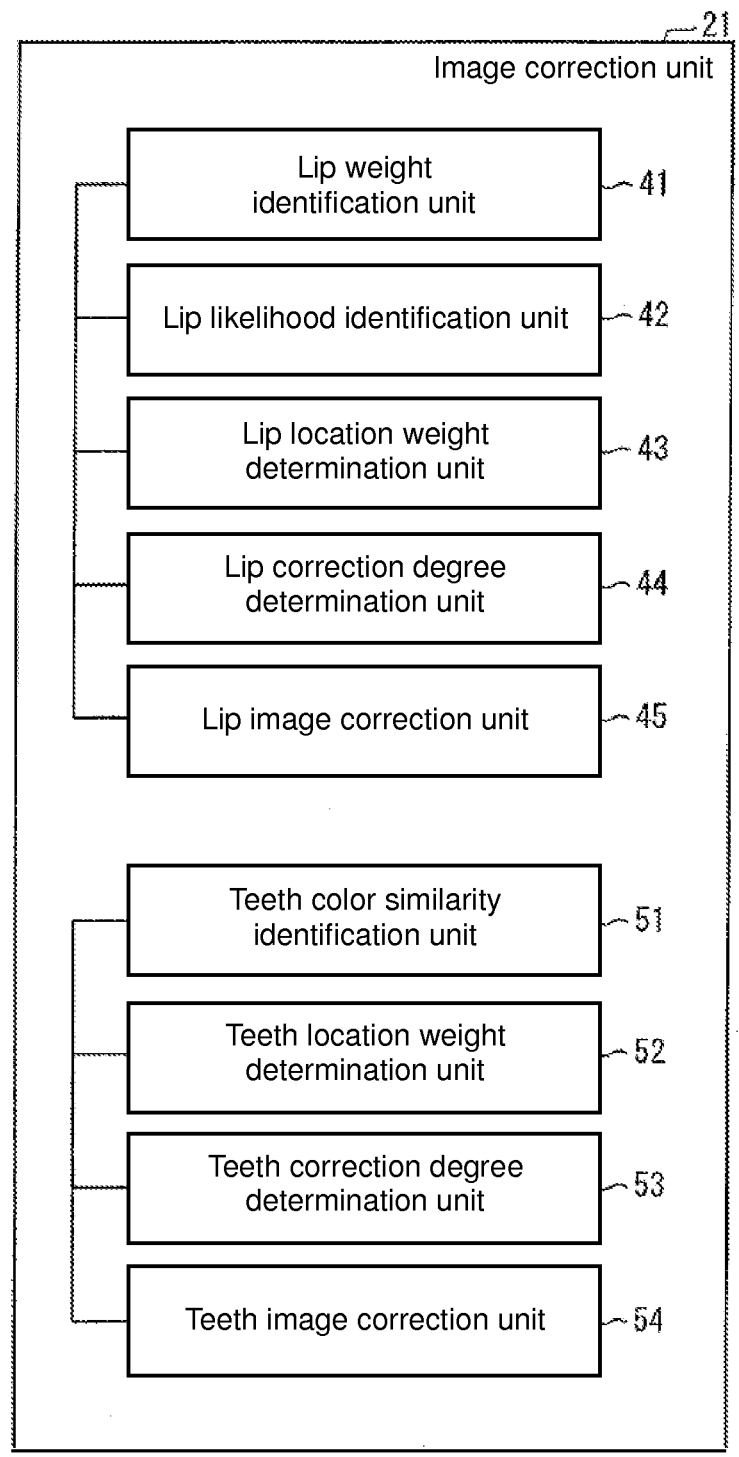
FIG. 1 is a block diagram showing a configuration of an image correction unit according to one embodiment of the present invention.

FIG. 1 is a block diagram showing a configuration of the image correction unit 21. The image correction unit 21 includes a lip weight identification unit (second weight determination unit) 41, a lip likelihood identification unit (organ likelihood identification unit) 42, a lip location weight determination unit (first weight determination unit) 43, a lip correction degree determination unit (correction degree determination unit) 44, a lip image correction unit (image correction unit) 45, a teeth color similarity identification unit (organ likelihood identification unit) 51, a teeth location weight determination unit (first weight determination unit) 52, a teeth correction degree determination unit (correction degree determination unit) 53, and a teeth image correction unit (image correction unit) 54. The image correction unit 21 performs the correction of appearance in the mouth image based on the instruction for correction process, the location of the feature of the face, the normalized mouth image, the smoothed mouth image, the representative color of the lip, and the representative color of the teeth, and generates a corrected mouth image. The method for correcting the mouth image will be described later. The image correction unit 21 outputs the corrected mouth image to the synthesizing unit 22.

The lip weight identification unit 41 determines a correction weight Wg corresponding to the location based on the information indicating the lip region.

The lip likelihood identification unit 42 identifies the likelihood of being the lip for each pixel based on the correction weight Wg, the lip candidate region, the representative color of the lip, and the like.

The lip location weight determination unit 43 obtains the weight of correction corresponding to the specific location based on the normalized mouth image and the likelihood of being the lip.

The lip correction degree determination unit 44 generates a gloss image based on the likelihood of being the lip and the weight of the correction corresponding to the specific location.

The lip image correction unit 45 generates the corrected mouth image based on the normalized mouth image, the smoothed mouth image, and the gloss image.

The teeth color similarity identification unit 51 obtains a teeth color similarity Wi corresponding to the distance in the color space between the color of the pixel and the representative color of the teeth for each pixel of the oral region based on the information indicating the oral region and the representative color of the teeth.

The teeth location weight determination unit 52 obtains a weight (correction weight Wh) for performing the image correction of the teeth with respect to each pixel location of the oral region based on the information indicating the oral region and the information of the mouth end point.

The teeth correction degree determination unit 53 generates a teeth gloss image for the oral region based on the information indicating the oral region, the teeth color similarity Wi, and the like.

The teeth image correction unit 54 synthesizes the normalized mouth image and the teeth gloss image to generate the corrected mouth image.

The synthesizing unit 22 returns the corrected mouth image to the original size of before the normalization (corrected mouth image is rotated and enlarged/reduced, as necessary), synthesizes the same to the image to be processed, and generates a corrected image. The image in which the appearance of the lip, and the like is corrected in the image to be processed is thereby obtained. The synthesizing unit 22 outputs the corrected image to the display control unit 23. The synthesizing unit 22 may output and store the corrected image in the image storage device 4.

The display control unit 23 outputs the corrected image to the display device 5, and controls the display device 5 to display the corrected image.

<Image Processing Flow for Lip Correction>

A flow of image correction process in the digital camera 30 will be hereinafter described.

The user selects the image to be processed from the images imaged and stored in the image storage device 4, for example, through the instruction input device 2. The user also selects the type of correction process (lip shine emphasizing correction, whitening correction of the teeth, etc.) to perform on the image to be processed from a plurality of candidates through the instruction input device 2. The instruction input device 2 outputs the instruction for correction process including the information on the type of instructed correction process to the image acquisition unit 11 of the image processing device 31.

Figure 6:
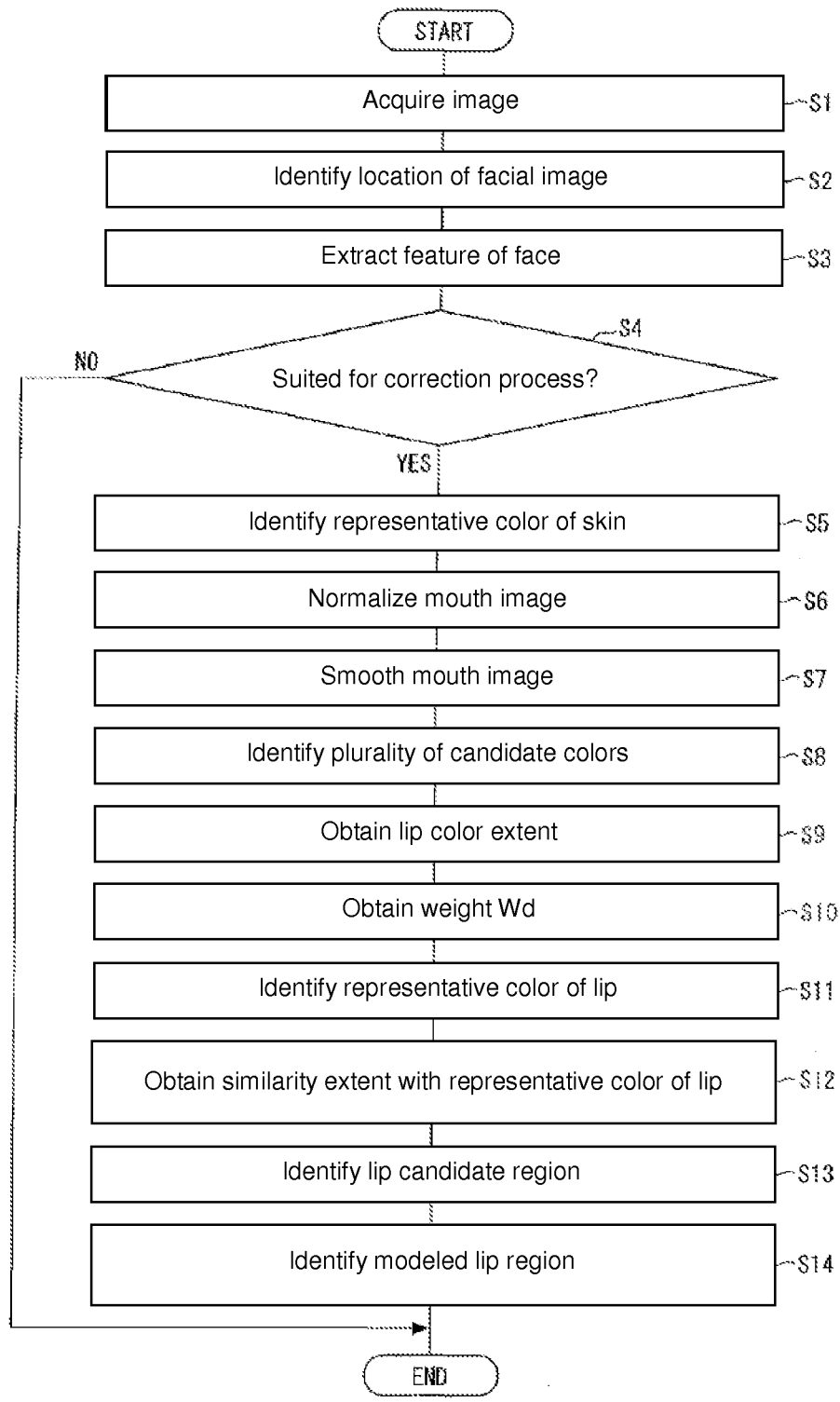
FIG. 6 is a flowchart showing a flow of lip color identification process and lip region identification process of the present embodiment.

FIG. 6 is a flowchart showing a flow of lip color identification process and lip region identification process in the image processing device 31.

The image acquisition unit 11 acquires the image to be processed from the image storage device 4 when receiving an instruction for correction process from the instruction input device 2 (S1).

The face detection unit 12 detects the facial image contained in the image to be processed, and identifies the location of the facial image (S2). The face detection unit 12 may detect a plurality of facial images included in the image to be processed.

The feature detection unit 13 detects the location of the feature of the face contained in the detected facial image (S3). The feature detection unit 13 detects the features (feature points) of the organs of the face such as the eye (inner corner, tail, etc.), the mouth (mouth end point, center point of mouth, etc.), the nose (top of nose, etc.), and the like, for example, and identifies the locations thereof. The feature detection unit 13 may detect the feature such as the contour, and the like of the face.

The appropriateness determination unit 14 determines whether or not the facial image is suited for performing the correction process based on locations of the detected features of the face (S4). For example, the appropriateness determination unit 14 stores the face model created by learning in advance the feature of the luminance distribution around each feature of the organ of the face such as the eye, nose, mouth, and the like from a plurality of facial image samples. The appropriateness determination unit 14 compares the face model and the detected facial image to identify the reliability of the detected feature of the facial image and the direction of the face.

For example, if the reliability of the detected feature is lower than a predetermined threshold value, there is a high possibility that the feature of the face is not accurately detected, and hence the correction process may not be appropriately performed on the mouth, lip, and the like. Thus, if the reliability of the detected feature is lower than the predetermined threshold value, the appropriateness determination unit 14 determines that the facial image is not suited to performing the correction process.

If the direction of the detected face is greatly shifted with respect to the front (if the direction of the face is not within a predetermined range, for example, if the direction of the face is greater than a predetermined angle (e.g., 30°) with respect to the front), the correction process may not be appropriately performed. In this case, the appropriateness determination unit 14 determines that the facial image is not suited to performing the correction process.

If the facial image is too small (e.g., if the distance between both end points of the detected mouth is smaller than a predetermined threshold value (e.g., 100 pixels)), the correction process may not be appropriately performed, and thus the appropriateness determination unit 14 determines that the facial image is not suited to performing the correction process.

When determined as not suited to performing the correction process (No in S4), the process on the facial image is terminated.

When determined as suited to performing the correction process (Yes in S4), the skin representative color identification unit 17 then identifies the representative color of the skin of the facial image to be processed for the facial image determined as appropriate for processing target (S5). The average color of the center portion (around the nose) of the face region is assumed as the representative color of the skin. The skin representative color identification unit 17 obtains the dispersion extent (standard deviation) of the color of the skin. Specifically, the variance $\sigma bs^2$ in the Cb axis of the color space of the pixel value of the pixel in the region (around the nose) where the average color is obtained, the variance $\sigma rs^2$ in the Cr axis, and the variance $\sigma ps^2$ of the hue are obtained.

The mouth image normalization unit 15 extracts the image of the mouth region of the facial image to be processed, and generates the mouth image in which the image size is normalized so that the mouth region of the image to be processed becomes a predetermined size (S6). Specifically, the mouth image normalization unit 15 rotates and enlarges/reduces the facial image to be processed, as necessary, so that the left and right end points of the mouth are located at predetermined coordinates, and crops the mouth region of a predetermined size from the facial image to be processed.

The smoothing unit 16 smoothes the normalized mouth image (S7).

The candidate color identification unit 18 divides the predetermined region at the middle in the horizontal direction of the mouth image into a plurality of regions lined in the longitudinal direction, and identifies the representative color of each divided region as a plurality of candidate colors for the color of the lip (S8). The average color of the region is assumed as the candidate color for each region.

The representative color of the skin and the plurality of candidate colors may not contain information on luminance. In the following process, the representative color of the color of the lip and the lip region are identified using the representative color of the skin and the plurality of candidate colors in the CbCr plane without using the luminance (Y).

The lip representative color identification unit 19 obtains the extent of being the color of the lip (lip color extent) for each candidate color (S9). The color of the lip of the mouth image is assumed to be a color different from the color of the skin, and have a hue different from the color of the skin. The color of the lip of the mouth image is assumed to be a color that is also different from the teeth, which generally appears whitish. The lip color extent becomes greater the greater the distance in the CbCr plane with the representative color of the skin, the greater the difference in hue with the representative color of the skin, and the greater the chroma.

Specifically, the lip representative color identification unit 19 obtains a first non-skin color extent (extent of not being the color of the skin), which becomes greater in accordance with the distance in the CbCr plane between the candidate color and the representative color of the skin, as the weight of the lip color extent for each candidate color. The lip representative color identification unit 19 obtains a second non-skin color extent, which becomes greater in accordance with the difference in hue between the candidate color and the representative color of the skin, as the weight of the lip color extent for each candidate color. The lip representative color identification unit 19 obtains a non-teeth color extent (extent of not being the color of the teeth), which becomes greater in accordance with the chroma of the candidate color, as the weight of the lip color extent for each candidate color.

A weight Wa (first non-skin color extent) of the lip color extent corresponding to the distance in the CbCr plane can be obtained with the following equation.

[Equation 1]

$$Wa = 1 - \exp\left\{-\frac{(Cbs - Cb)^2 + (Crs - Cr)^2}{\sigma bs^2 + \sigma rs^2}\right\} \quad (1)$$

Figure 7A:
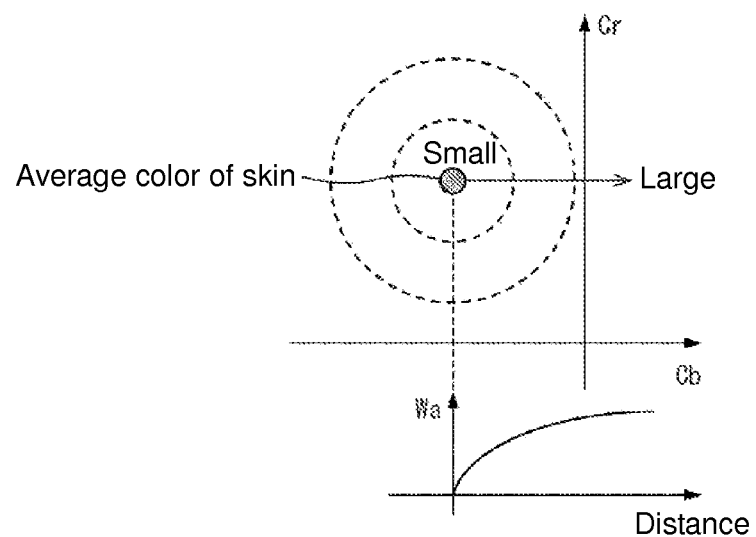
FIG. 7($a$) is a view showing a relationship of a distance in the CbCr plane between a candidate color and a representative color of the skin, and a weight Wa, and FIG. 7($b$) corresponds to FIG. 3($b$), and is an image showing the result of calculating the weight Wa of each pixel of the mouth image in place of the candidate color.
Figure 7B:
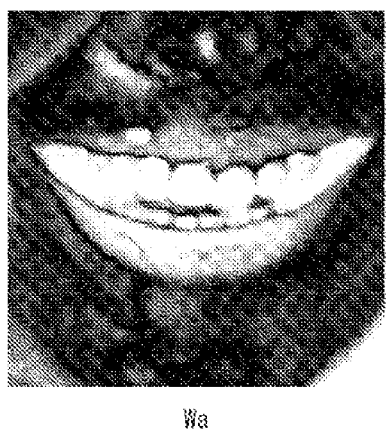

Here, Cbs and Crs are Cb component and Cr component of the representative color (average color) of the skin, respectively, and Cb and Cr are Cb component and Cr component of the candidate color, respectively. Furthermore, σbs and σrs are the standard deviation of the color of the skin in the Cb axis and the standard deviation of the color of the skin in the Cr axis of the color space, respectively. FIG. 7(*a*) is a view showing a relationship of the distance in the CbCr plane between the candidate color and the representative color of the skin, and the weight Wa. According to equation (1), the weight Wa becomes closer to zero the smaller the distance in the CbCr plane between the candidate color and the representative color of the skin, and the weight Wa becomes greater and approaches one the greater the distance in the CbCr plane between the candidate color and the representative color of the skin. FIG. 7(*b*) corresponds to FIG. 3(*b*), and is an image showing the result of calculating the weight Wa by applying the pixel value of each pixel of the mouth image to equation (1) in place of the candidate color. The light area indicates that the weight Wa is large and the dark area indicates that the weight Wa is small. Accordingly, it can be seen that the region of the lip has a large weight Wa. However, the region of the teeth also has a large weight Wa.

A weight Wb (second non-skin color extent) of the lip color extent corresponding to the difference in hue can be obtained with the following equation.

[Equation 2]

$$Wb = 1 + \alpha - \exp\left\{-\frac{(Ps - P)^2}{\sigma ps^2}\right\} \quad (2)$$

Figure 8:
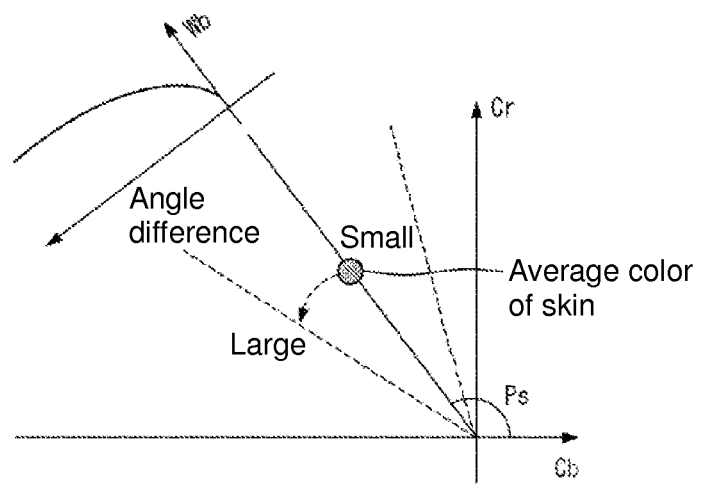
FIG. 8($a$) is a view showing a relationship of a hue in the CbCr plane of the candidate color and the representative color of the skin, and a weight Wb, and FIG. 8($b$) corresponds to FIG. 3($b$), and is an image showing the result of calculating the weight Wb of each pixel of the mouth image in place of the candidate color.
Figure 8B:
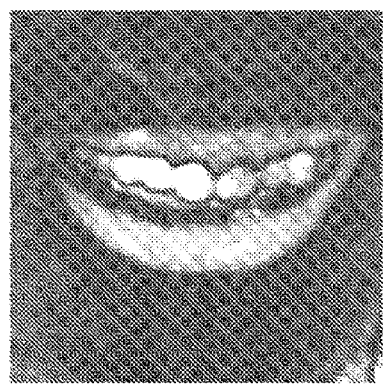

Here, Ps is the hue of the representative color (average color) of the skin, and is indicated with an angle of the phase in the CbCr plane. P is the hue of the candidate color. Furthermore, σps is the standard deviation of the hue of the color of the skin. α is a predetermined constant provided so that the weight Wb does not become zero even if the hue of the candidate color and the hue of the representative color of the skin are the same. FIG. 8(*a*) is a view showing a relationship of the hue in the CbCr plane of the candidate color and the representative color of the skin, and the weight Wb. According to equation (2), the weight Wb becomes closer to α the smaller the difference in hue between the candidate color and the representative color of the skin, and the weight Wb becomes greater and approaches 1+α the greater the difference in hue between the candidate color and the representative color of the skin. FIG. 8(*b*) corresponds to FIG. 3(*b*), and is an image showing the result of calculating the weight Wb by applying the pixel value of each pixel of the mouth image to equation (2) in place of the candidate color. The light area indicates that the weight Wb is large and the dark area indicates that the weight Wb is small. Accordingly, it can be seen that the region of the lip has a large weight Wb. However, the region of a part of the teeth also has a large weight Wb.

A weight Wc (non-teeth color extent) of the lip color extent corresponding to the chroma can be obtained with the following equation.

[Equation 3]

$$Wc = 1 - \exp\left\{-\frac{Cb^2 + Cr^2}{c}\right\} \quad (3)$$

Figure 9:
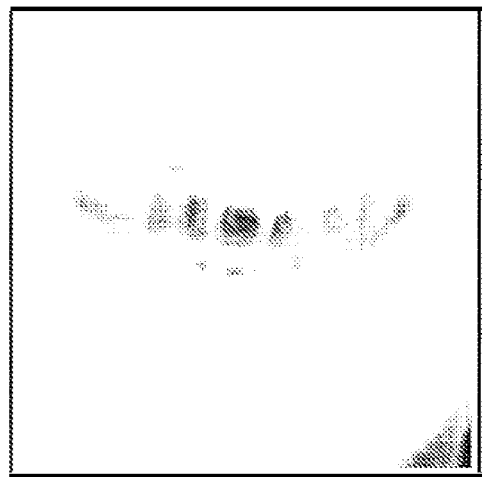
FIG. 9 corresponds to FIG. 3($b$), and is an image showing the result of calculating a weight Wc of each pixel of the mouth image in place of the candidate color.

Here, Cb and Cr are the Cb component and the Cr component of the candidate color, respectively. Furthermore, c is a predetermined constant. The numerator of exp in equation (3) represents chroma. According to equation (3), the weight Wc becomes closer to zero the smaller the chroma of the candidate color, and the weight Wc becomes greater and approaches one the greater the chroma of the candidate color. FIG. 9 corresponds to FIG. 3(*b*), and is an image showing the result of calculating the weight Wc by applying the pixel value of each pixel of the mouth image to equation (3) in place of the candidate color. The light area indicates that the weight Wc is large and the dark area indicates that the weight Wc is small. Accordingly, it can be seen that the region of the lip has a large weight Wc. The region of a part of the teeth having a whitish color has a small weight Wc. A part in the mouth that tends to appear dark in the photograph also has a small weight Wc.

If the skin in one image has contrasting density due to illumination, and the like, the distance in the color space or the CbCr plane from the average color of the skin to the color of each point of the skin generally tends to become large even with the skin of the same person. In other words, the variance in the color space or the CbCr plane of the color of the skin tends to become large. The hue, on the other hand, barely changes by conditions such as illumination, and the like. Thus, even if the value of the weight Wa corresponding to the distance in the CbCr plane is the same extent for the skin of one part and the lip, the color of the skin and the color of the lip can be distinguished by the weight Wb corresponding to the difference in hue.

If the color of the lip and the color of the skin in one image have the same hue due to lipstick, and the like, the value of the weight Wb corresponding to the difference in hue may be the same extent for the skin and the lip. In such a case, the color of the skin and the color of the lip can be distinguished by the weight Wa corresponding to the distance in the CbCr plane.

In the candidate color obtained from the region of the teeth, the weight Wa corresponding to the distance in the CbCr plane and the weight Wb corresponding to the difference in hue both may become large. The color of the teeth is generally whitish and has a small chroma, whereas the color of the lip has a large chroma, and hence the color of the teeth and the color of the lip can be distinguished by the weight Wc corresponding to the chroma. Furthermore, the area and the like that appear dark as a shadow in the mouth also has a low chroma, so that distinction with the color of the lip can be made by the weight Wc corresponding to the chroma.

The lip representative color identification unit 19 obtains the product of the first non-skin color extent Wa, the second non-skin color extent Wb, and the non-teeth color extent Wc as a lip color extent D1 for each candidate color.
[Equation 4]

$$D1 = Wa \times Wb \times Wc \quad (4)$$

Figure 10:
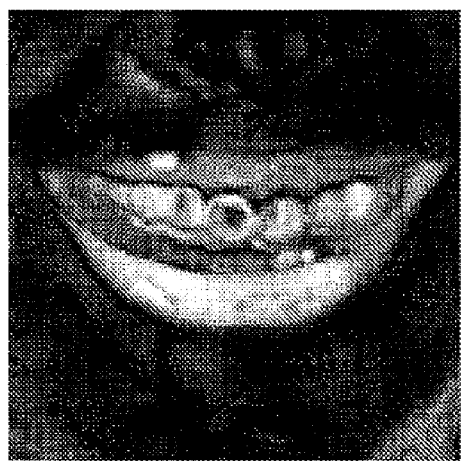
FIG. 10 corresponds to FIG. 3($b$), and is an image showing the result of calculating a lip color extent D1 from the pixel value of each pixel of the mouth image in place of the candidate color.

FIG. 10 corresponds to FIG. 3(*b*), and is an image showing the result of calculating the lip color extent D1 from the pixel value of each pixel of the mouth image in place of the candidate color. The light area indicates that the lip color extent D1 is large, and the dark area indicates that the lip color extent D1 is small. The candidate color having a large lip color extent D1 has a high possibility of being the color of the lip. In the example shown in FIG. 10, the candidate color obtained from the lip region has the largest lip color extent D1. The lip representative color identification unit 19 selects the candidate color having the largest lip color extent D1 as the first candidate (first selection candidate color) of the lip color. If the chroma of the color of the region of the teeth is not small such as when the teeth of the image is stained, or if the difference between the color of the lip and the color of the skin in the CbCr plane is small, there is a possibility of selecting the color of the teeth as the first selection candidate color.

In the embodiment, a second candidate (second selection candidate color) in which the difference in hue/chroma is large with respect to the first selection candidate color is selected from the remaining candidate colors, and either the first selection candidate color or the second selection candidate color is identified as the color of the lip.

The lip representative color identification unit 19 obtains a weight Wd (extent of not being the first selection candidate color) that becomes greater according to the distance in the CbCr plane between the candidate color and the first selection candidate color for each other candidate color excluding the first selection candidate color (S10). The weight Wd corresponding to the distance with the first selection candidate color can be obtained with the following equation.

[Equation 5]

$$Wd = 1 - \exp\left\{ -\frac{(Cbd - Cb)^2 + (Crd - Cr)^2}{\sigma bd^2 + \sigma rd^2} \right\} \quad (5)$$

Figure 11:
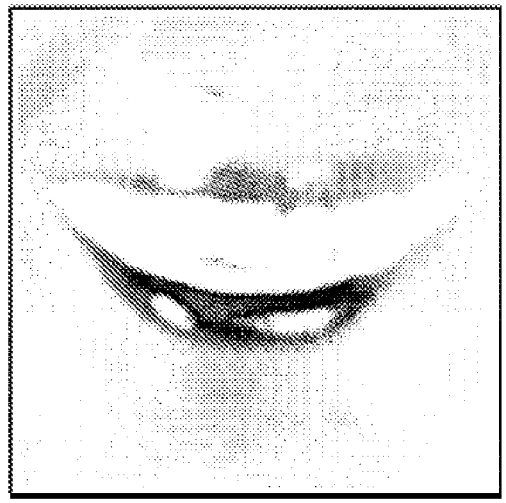
FIG. 11 corresponds to FIG. 3($b$), and is an image showing the result of calculating a weight Wd of each pixel of the mouth image in place of the candidate color.

Here, Cbd and Crd are Cb component and Cr component of the first selection candidate color, respectively, and Cb and Cr are Cb component and Cr component of the candidate color, respectively. Furthermore, σbd and σrd are the standard deviation of the first selection candidate color in the Cb axis of the color space (standard deviation of the Cb component of each pixel of the region of the first selection candidate color), and the standard deviation of the first selection candidate color in the Cr axis (standard deviation of the Cr component of each pixel of the region of the first selection candidate color), respectively. The standard deviation of the first selection candidate color can be obtained from the pixel value of each pixel of the region (region divided by the candidate color identification unit 18) corresponding to the selection candidate color. According to equation (5), the weight Wd becomes closer to zero the smaller the distance in the CbCr plane between the first selection candidate color and the other candidate colors, and the weight Wd becomes greater and approaches one the greater the distance in the CbCr plane between the first selection candidate color and the other candidate colors. FIG. 11 corresponds to FIG. 3(*b*), and is an image showing the result of calculating the weight Wd by applying the pixel value of each pixel of the mouth image to equation (5) in place of the candidate color. The light area indicates that the weight Wd is large and the dark area indicates that the weight Wd is small. In the example shown in FIG. 11, the candidate color obtained from the lip region is selected as the first selection candidate color. Thus, the weight Wd of the pixel of the lip region becomes small.

The lip representative color identification unit 19 obtains the product of the lip color extent D1 and the weight Wd as a candidate evaluation value D2 for each candidate color.
[Equation 6]

$$D2 = D1 \times Wd \quad (6)$$

Figure 12:
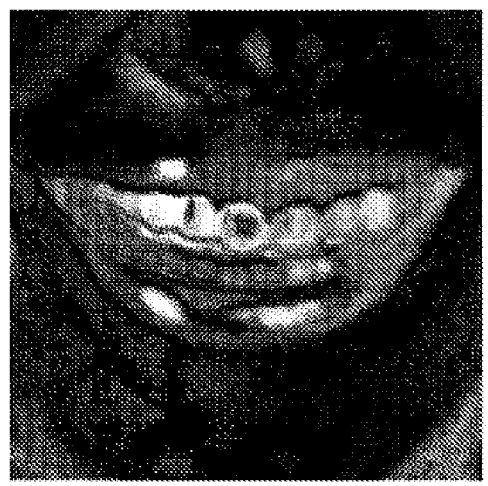
FIG. 12 corresponds to FIG. 3($b$), and is an image showing the result of calculating a candidate evaluation value D2 from the pixel value of each pixel of the mouth image in place of the candidate color.

FIG. 12 corresponds to FIG. 3(*b*), and is an image showing the result of calculating the candidate evaluation value D2 from the pixel value of each pixel of the mouth image in place of the candidate color. The light area indicates that the candidate evaluation value D2 is large, and the dark area indicates that the candidate evaluation value D2 is small. The lip representative color identification unit 19 selects the candidate color having the largest candidate evaluation value D2 as the second candidate (second selection candidate color) of the lip color. Therefore, if the color of the teeth is selected for the first selection candidate color, the candidate color obtained from the region of the lip is assumed to be selected for the second selection candidate color. The first selection candidate color and the second selection candidate color have a high possibility of being the candidate colors obtained from different regions (different parts of the face) due to the weight Wd. An appropriate candidate color can be included as the color of the lip in either one of the selection candidate color by selecting the two candidate colors, which are different colors, as the selection candidate colors from the plurality of candidate colors.

The lip representative color identification unit 19 identifies the selection candidate color that is more like the color of the lip as the representative color of the lip from the first and second selection candidate colors (S11). According to the processes up to S10, there is a high possibility that the candidate color obtained from the region of the lip and the candidate color obtained from the region of the teeth are selected for the first and second selection candidate colors. The lip representative color identification unit 19 identifies the first or second selection candidate color having a greater chroma as the representative color of the lip. The lip representative color identification unit 19 may identify the luminance Y of the representative color of the lip or may not identify the luminance Y. The hue and the chroma (or Cb component and Cr component) of the representative color of the lip may at least be identified.

The representative color of the lip may be determined in the following manner. The lip representative color identification unit 19 may select one first selection candidate color according to the lip color extent D1 and identify the same as the color of the lip. The lip representative color identification unit 19 may select a plurality of first selection candidate colors according to the lip color extent D1, and identify therefrom the first selection candidate color having a large chroma as the representative color of the lip. The lip representative color identification unit 19 may select the first selection candidate color according to the lip color extent D1, select a plurality of second selection candidate colors according to the candidate evaluation value D2, and identify from the first selection candidate color and the plurality of second selection candidate colors that having the largest chroma as the representative color of the lip. The lip representative color identification unit 19 may identify from the first and second selection candidate colors that whose hue is closest to a predetermined hue as the representative color of the lip. Since the lip is often assumed as red in most cases, a predetermined hue may be the hue close to red, which is a typical color of the lip, for example.

The lip region identification unit 20 obtains the similarity with the representative color of the lip for each pixel of the mouth image (S12). The region of the color similar to the representative color of the lip is assumed to be the region of the lip. The lip region identification unit 20 identifies the region similar to the representative color of the lip according to the difference in hue and chroma of the representative color of the lip and the color of each pixel. Specifically, the lip region identification unit (mouth color similarity identification unit) 20 obtains, for each pixel, a first lip color similarity We corresponding to the distance in the CbCr plane between the color of each pixel and the representative color of the lip, and a second lip color similarity Wf corresponding to the difference in hue between the color of each pixel and the representative color of the lip.

The first lip color similarity We corresponding to the distance in the CbCr plane can be obtained with the following equation.

[Equation 7]

$$We = \exp\left\{-\frac{(Cbl - Cb)^2 + (Crl - Cr)^2}{\sigma bl^2 + \sigma rl^2}\right\} \quad (7)$$

Figure 13A:
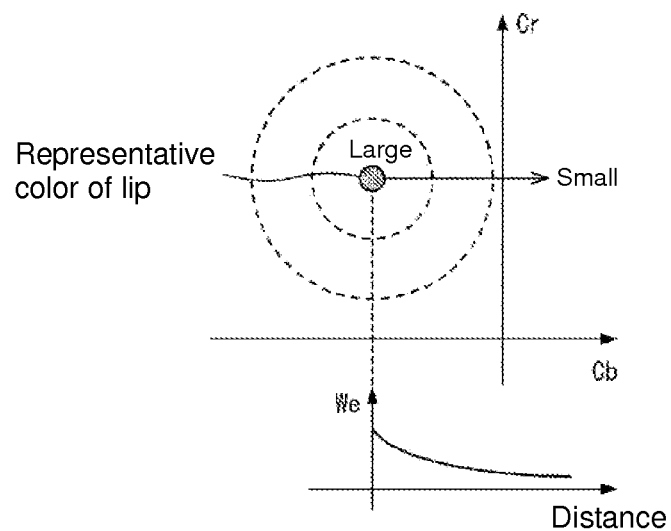
FIG. 13($a$) is a view showing a relationship of a distance in the CbCr plane between the color of each pixel and the representative color of the lip and a first lip color similarity We, and FIG. 13($b$) corresponds to FIG. 3($b$), and is an image showing the result of calculating the first lip color similarity We of each pixel of the mouth image.
Figure 13B:
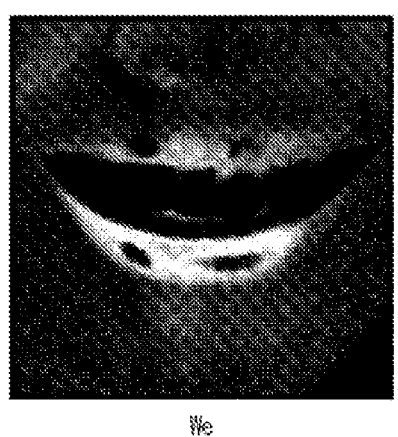

Here, Cbl and Crl are Cb component and Cr component of the representative color of the lip, respectively, and Cb and Cr are Cb component and Cr component of the color of each pixel, respectively. Furthermore, σbl and σrl are the standard deviation of the color of the lip in the Cb axis and the standard deviation of the color of the lip in the Cr axis of the color space, respectively. The standard deviation of the color of the lip can be obtained from the color of each pixel of the region (region divided by the candidate color identification unit 18) corresponding to the representative color of the lip (candidate color ultimately identified as the representative color of the lip). FIG. 13(a) is a view showing a relationship of the distance in the CbCr plane between the color of each pixel and the representative color of the lip, and the first lip color similarity We. According to equation (7), the first lip color similarity We becomes closer to one the smaller the distance in the CbCr plane between the color of each pixel and the representative color of the lip, and the first lip color similarity We becomes smaller and approaches zero the greater the distance in the CbCr plane between the color of each pixel and the representative color of the lip. FIG. 13(b) corresponds to FIG. 3(b), and is an image showing the result of calculating the first lip color similarity We by applying the color of each pixel of the mouth image to equation (7). The light area indicates that the first lip color similarity We is large, and the dark area indicates that the first lip color similarity We is small. Accordingly, it can be seen that the region of the lip has a large first lip color similarity We. However, a part of the region of the lip appears bright due to the illumination and the like and has small chroma, and hence the first lip color similarity We is small. The first lip color similarity We also has a possibility of becoming small if there is shadow, and the like at the lip.

The second lip color similarity Wf corresponding to the difference in hue can be obtained with the following equation.

[Equation 8]

$$Wf = \exp\left\{-\frac{(Pl - P)^2}{\sigma pl^2}\right\} \quad (8)$$

Figure 14A:
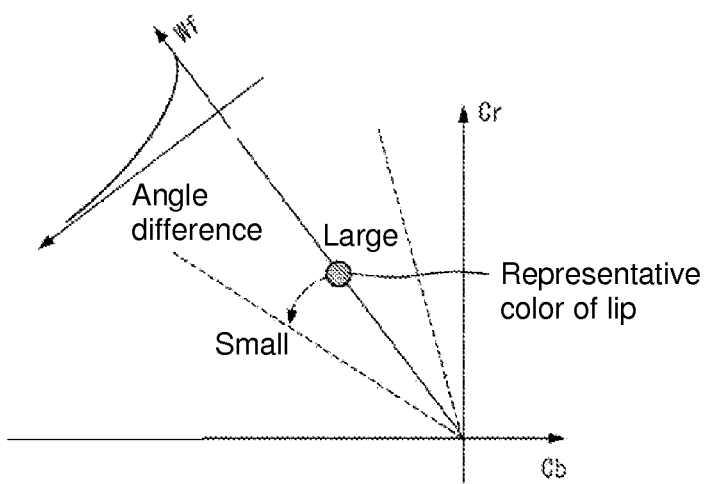
FIG. 14($a$) is a view showing a relationship of the hue in the CbCr plane of the color of each pixel and the representative color of the lip and a second lip color similarity Wf, and FIG. 14($b$) corresponds to FIG. 3($b$), and is an image showing the result of calculating the second lip color similarity Wf of each pixel of the mouth image.
Figure 14B:
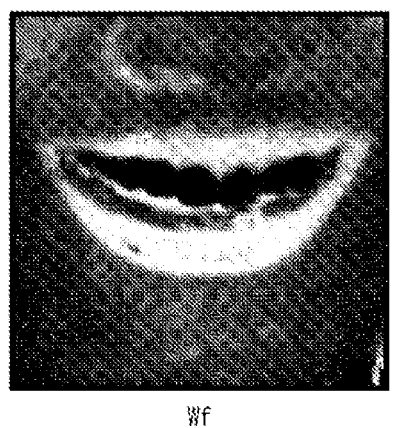

Here, Pl is the hue of the representative color of the lip, and is indicated with an angle of the phase in the CbCr plane. P is the hue of the color of each pixel. Furthermore, σpl is the standard deviation of the hue of the color of the lip. FIG. 14(a) is a view showing a relationship of the hue in the CbCr plane of the color of each pixel and the representative color of the lip, and the second lip color similarity Wf. According to equation (8), the second lip color similarity Wf becomes closer to one the smaller the difference in hue between the color of each pixel and the representative color of the lip, and the second lip color similarity Wf becomes smaller and approaches zero the greater the difference in hue between the color of each pixel and the representative color of the lip. FIG. 14(b) corresponds to FIG. 3(b), and is an image showing the result of calculating the second lip color similarity Wf by applying the color of each pixel of the mouth image to equation (8). The light area indicates that the second lip color similarity Wf is large, and the dark area indicates that the second lip color similarity Wf is small. Accordingly, it can be seen that the region of the lip has a large second lip color similarity Wf.

The second lip color similarity Wf corresponding to the difference in hue is less likely to be subjected to the influence of illumination and the like compared to the first lip color similarity We, and hence stable and accurate results can be obtained. The lip may be in various colors as lipstick, lip gloss, and the like can be applied. If the lipstick of the same hue as the color of the skin is applied on the lip, it is difficult to accurately identify the region of the lip with the second lip color similarity Wf corresponding to the difference in hue. If the hue of the color of the lip is similar to the hue of the color of the skin, therefore, the first lip color similarity We may become a better index for determining the region of the lip.

Figure 15:
FIG. 15 corresponds to FIG. 3($b$) and is an image showing the pixels classified to a lip candidate region.

The lip region identification unit 20 identifies the region (lip candidate region, first lip region) to become the candidate of the lip from the mouth image based on the first lip color similarity We and the second lip color similarity Wf (S13). The lip candidate region may be said as a region having a color similar to the representative color of the lip. In the embodiment, the lip region identification unit 20 determines the pixel, in which the value of at least one of the first lip color similarity We and the second lip color similarity Wf is large, as the lip candidate region. Specifically, the lip region identification unit 20 compares the first lip color similarity We with a predetermined threshold value for each pixel, and classifies the pixel, in which first lip color similarity We is greater than the threshold value, in the lip candidate region. The lip region identification unit 20 also compares the second lip color similarity Wf with another threshold value for each pixel, and classifies the pixel, in which second lip color similarity Wf is greater than the threshold value, in the lip candidate region. FIG. 15 corresponds to FIG. 3(*b*) and is a view showing the pixels classified in the lip candidate region. The light area indicates the lip candidate region. The image shown in FIG. 15 corresponds to the result of binarizing the image shown in FIG. 13(*b*) and the image shown in FIG. 14(*b*), respectively, based on the threshold value and adding the same.

The lip region identification unit 20 may identify the lip candidate region using only either one of the first lip color similarity We or the second lip color similarity Wf. The lip region identification unit 20 may identify the pixel, in which first lip color similarity We is greater than the threshold value and the second lip color similarity Wf is greater than another threshold value, as the lip candidate region. In this case, the image showing the lip candidate region corresponds to the result of binarizing the image shown in FIG. 13(*b*) and the image shown in FIG. 14(*b*), respectively, and multiplying the same. The lip region identification unit 20 may add or multiple the first lip color similarity We and the second lip color similarity Wf before binarization for each pixel, and identify the lip candidate region according to the result. The lip region identification unit 20 may also identify the pixel, in which 1−(1−We)×(1−Wf) is greater than a predetermined threshold value, as the lip candidate region. The lip region identification unit 20 may exclude from the lip candidate region the area that can be determined as apparently not the lip from the distribution of the lip candidate region.

The lip region identification unit 20 identifies a modeled lip region (second lip region) from the lip candidate region of the mouth image (S14). There are a variety of methods for identifying the modeled lip region, and the boundary of the lip candidate region of the mouth image may be approximated with a function (high dimensional function, etc.) that becomes the model, the lip shape model prepared in advance may be fitted to the spatial distribution of the lip candidate region to identify the lip region, or the lip region may be identified through a segmentation technique based on the lip shape model prepared in advance. The lip shape model defines the shape of the lip that is like the lip with function, range, or the like, and may be defined with a predetermined procedure showing the range of the lip.

Figure 16A:
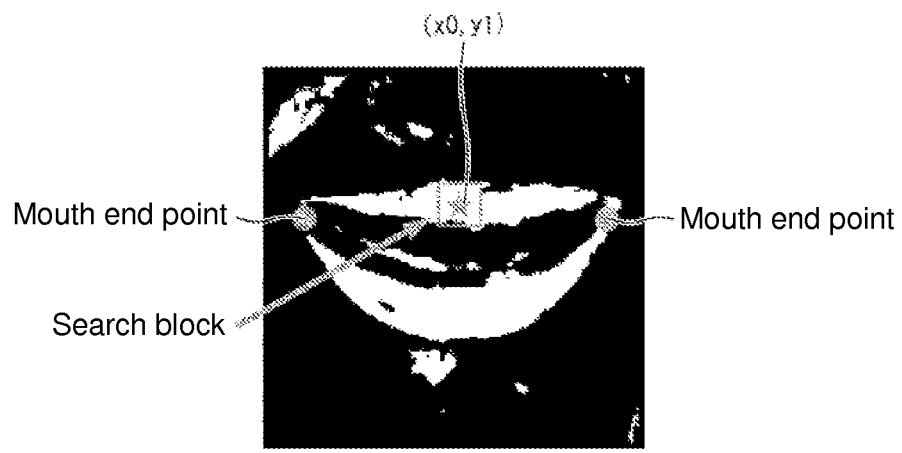
FIGS. 16($a$) and 16($b$) correspond to FIG. 15, and are images showing a procedure for identifying a modeled lip region from the image showing the lip candidate region.
Figure 16B:
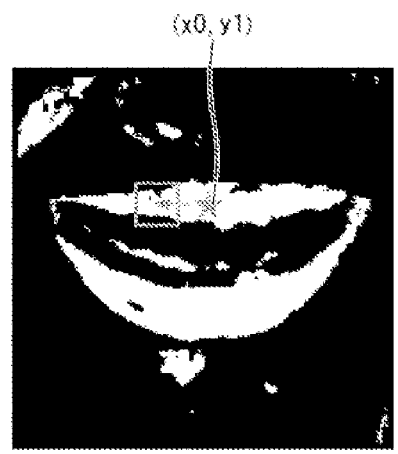

The specific process for identifying the modeled lip region carried out in the embodiment will be described below. FIG. 16(*a*) and FIG. 16(*b*) correspond to FIG. 15, and are images showing the procedure for identifying the modeled lip region from the image showing the lip candidate region. The x axis is taken in the horizontal direction, and the y axis is taken in the longitudinal (vertical) direction. First, the modeled lip region is identified for the upper lip. The x coordinate (x0) at the middle in the horizontal direction of the mouth is identified from the locations of the left and right mouth end points, which are known. The center location (y coordinate y0) in the longitudinal direction of the upper lip region is estimated from the locations of the upper end and the lower end of the lip candidate region of the upper lip continuously distributed in the longitudinal direction at the middle in the horizontal direction (x coordinate=x0).

A rectangle of a predetermined size is set as a search block with the coordinate (x0, y0) as the center location (FIG. 16(*a*)). The search block preferably has a large size in the longitudinal direction to an extent of including the upper end and the lower end of the candidate region of the upper lip. In the search block of the initial location, the barycentric position of the pixel of the lip candidate region in the search block is obtained, and the y coordinate of the barycentric position is assumed as the center location (y coordinate=y1) in the longitudinal direction of the lip region of the upper lip at the x coordinate=x0.

The search block is then moved toward the mouth end side by Δx, and the search block is set with the coordinate (x1, y1) as the center location (FIG. 16(*b*)). x1=x0+Δx is obtained. The barycentric position of the pixel of the lip candidate region in the moved search block is then obtained, and the y coordinate of the barycentric position is assumed as the center location (y coordinate=y2) in the longitudinal direction of the lip region of the upper lip at the x coordinate=x1.

The coordinates (x0, y1), (x1, y2), . . . ) of a plurality of points indicating the center location in the longitudinal direction of the lip region of the upper lip are obtained by sequentially shifting the search block to the vicinity of the mouth end point and performing the calculation of the barycenter. The process may be continued until the search block reaches a predetermined location (e.g., mouth end point) or the process may be continued up to the location where the lip candidate region is disconnected. For example, a curve indicating the center location in the longitudinal direction of the lip region of the upper lip can be obtained by obtaining a curve (secondary curve, curve of higher dimension, etc.) connecting a plurality of points indicating the center location in the longitudinal direction of the lip region of the upper lip. A plurality of points indicating the center location in the longitudinal direction of the lip region of the lower lip can also be similarly obtained.

Figure 17:
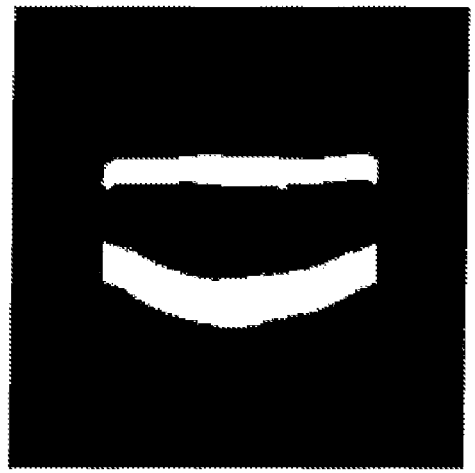
FIG. 17 corresponds to FIG. 16($a$), and is an image showing the modeled lip region.

The lip region identification unit 20 identifies the range of a predetermined width in the longitudinal direction having each point indicating the center location in the longitudinal direction of the lip region as the center as the modeled lip region. In the embodiment, the range of the predetermined width in the longitudinal direction having each point indicating the center location in the longitudinal direction of the lip region as the center can be assumed as the lip shape model representing the lip-like shape. FIG. 17 corresponds to FIG. 16(*a*), and is an image showing the modeled lip region. The light area indicates the lip region. The lip region that appears like the lip can be identified while eliminating noise, and the like by identifying the modeled lip shaped region as the lip region from the lip candidate region. In the example shown in FIG. 17, the vicinity of the mouth end is excluded from the lip region on purpose so that the correction process is not performed on the skin in the vicinity of the mouth end in the subsequent correction process of the lip.

At the vicinity of the middle in the horizontal direction of the mouth, the distance from the upper end to the lower end of the lip candidate region continuously distributed in the longitudinal direction may be the width in the longitudinal direction of the modeled lip region. The lip region identification unit 20 may obtain a curve connecting each point indicating the center location in the longitudinal direction of the lip region, and identify the region of a predetermined width in the longitudinal direction of the curve as the modeled lip region. The lip region identification unit 20 may identify the lip region based on each point indicating the center location in the longitudinal direction of the lip region such that the width in the longitudinal direction of the lip region becomes smaller toward the mouth end point side. Accordingly, the identified lip region becomes a more natural model lip shape.

The lip region identification unit 20 identifies the lip region in the above manner. The lip region identification unit 20 may identify the pixel of the lip candidate region as the lip region. The lip region identification unit 20 may identify only the region, which is the lip candidate region and which is the modeled lip region, (region obtained by multiplying the region of the image of FIG. 15 and the region of the image of FIG. 17) as the lip region. The lip color identification process and the lip region identification process are thereby completed.

The lip shine emphasizing correction is then performed on the identified lip region. The gloss (shine) of the lip is increased so that the lip seems as if applied with lip gloss. To this end, the luminance of the region of one part of the lip is increased and the color change of the lip region is made smooth overall. Specifically, the gloss image for adding luminance to the pixel of one part of the lip region is prepared, and the gloss image is superimposed (synthesized) on the mouth image in which the lip region is smoothed to smooth the lip region and increase the gloss of one part of the lip.

Figure 18:
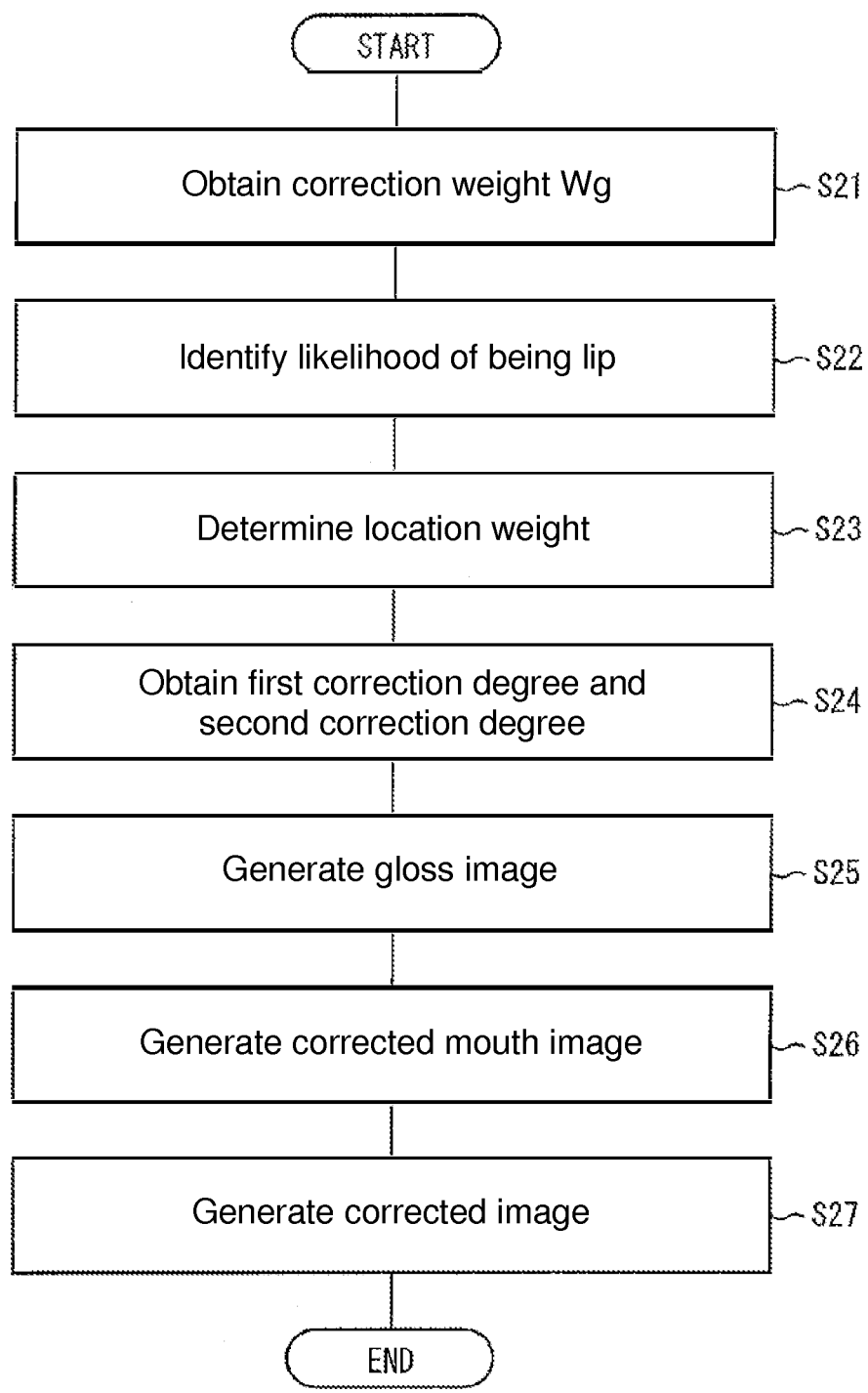
FIG. 18 is a flowchart showing a flow of correction process of the embodiment.

FIG. 18 is a flowchart showing a flow of correction process in the image processing device 31.

The lip weight identification unit 41 of the image correction unit 21 obtains the weight (correction weight Wg) for performing the image correction of the lip with respect to each pixel location of the lip region shown in FIG. 17 (S21). For example, the correction of gloss enhancement may be applied more strongly in the vicinity of the center of the lip region and the correction of gloss enhancement may be applied weaker in the vicinity of the peripheral part (vicinity of the boundary) of the lip region to perform the image correction that appears natural.

Figure 19:
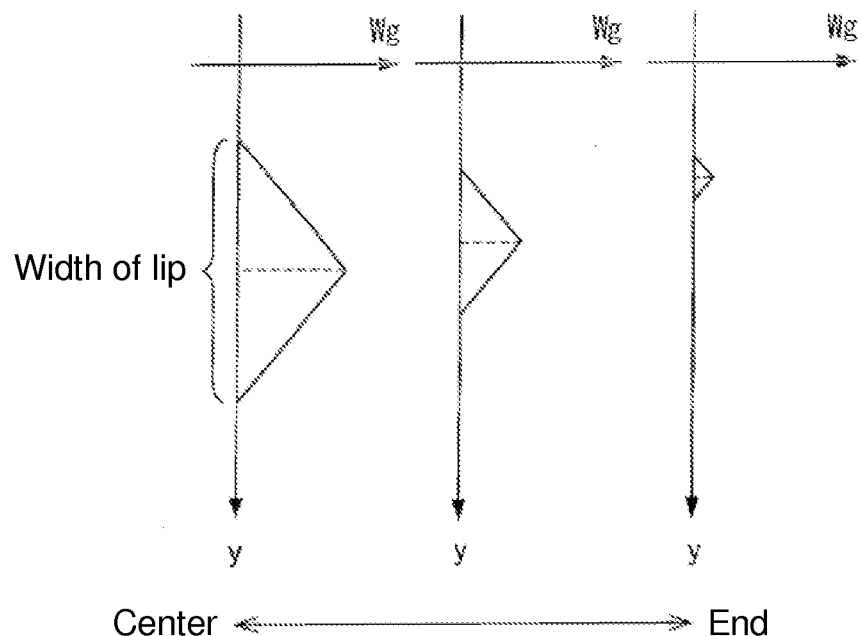
FIG. 19 is a view showing a correction weight Wg at each horizontal location.
Figure 20:
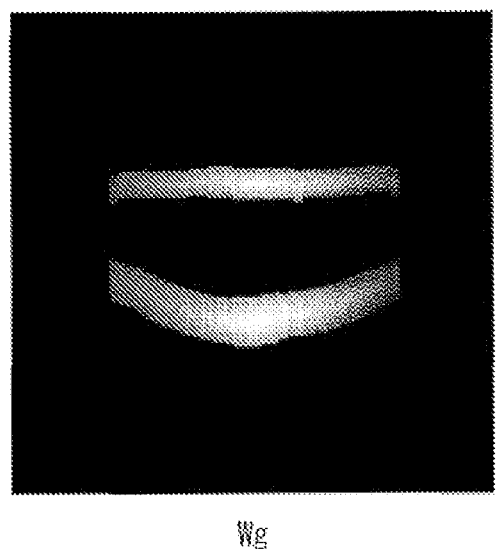
FIG. 20 corresponds to FIG. 17, and is an image showing the correction weight Wg.

Specifically, the lip weight identification unit 41 sets the correction weight Wg (second weight) such that the weight is greater toward the center location in the horizontal direction of the lip region and the weight is smaller toward the outer side (toward the mouth end point) in the horizontal direction of the lip region for each upper and lower lips. The lip weight identification unit 41 may also set the correction weight Wg such that the weight is greater toward the center location in the longitudinal direction of the lip region and the weight is smaller toward the end in the longitudinal direction of the lip region for each upper and lower lip. For example, the correction weight is one at the center location in the horizontal direction and the center location (first location) in the longitudinal direction of the lip region, and the correction weight is zero at the center location in the horizontal direction of the lip region and the end of the lip region in the longitudinal direction. Furthermore, the correction weight is 0.5 at the end on the outer side in the horizontal direction of the lip region and the center location in the longitudinal direction, and the correction weight is 0 at the end on the outer side in the horizontal direction of the lip region and the end of the lip region in the longitudinal direction. The correction weight in between may be linearly changed, for example. FIG. 19 is a view showing the correction weight Wg at each horizontal location. The longitudinal axis indicates the location in the longitudinal direction of the lip region, and the horizontal axis indicates the correction weight Wg at each location. The graph on the left side corresponds to the location of the center in the horizontal direction of the lip region, and the graph on the right side corresponds to the location on the outer side in the horizontal direction of the lip region. At each horizontal location, the correction weight Wg is large at the center of the width of the lip region. The correction weight Wg is great at the center in the horizontal direction. FIG. 20 corresponds to FIG. 17 and is an image showing the correction weight Wg. The light area indicates that the correction weight Wg is large. With respect to the lip region shown in FIG. 17, it can be seen that the correction weight of the region that appears more like the lip is large in the correction weight Wg shown in FIG. 20. This process may be performed by the lip region identification unit 20, so that the lip region identification unit 20 may identify the result of binarizing the image shown in FIG. 20 as the lip region.

Figure 21:
FIG. 21 corresponds to FIG. 20, and is an image showing a correcting portion evaluation value D3.

The lip likelihood identification unit 42 of the image correction unit 21 identifies the likelihood of being the lip for each pixel of the lip candidate region (first region) to be processed based on the correction weight Wg, the lip candidate region, the first lip color similarity We, and the second lip color similarity Wf (S22). Specifically, the lip likelihood identification unit 42 obtains the product of the correction weight Wg (FIG. 20), the lip candidate region (FIG. 17), the first lip color similarity We (FIG. 13(b)), and the second lip color similarity Wf (FIG. 14(b)) as a correcting portion evaluation value D3 (first organ likelihood) for each pixel. FIG. 21 corresponds to FIG. 20, and is an image showing the correcting portion evaluation value D3. The light area indicates that the value of correcting portion evaluation value D3 is large. If the correction weight Wg (0 to 1), the lip candidate region (0 or 1), the first lip color similarity We (0 to 1), and the second lip color similarity Wf (0 to 1) are large, that is, if the correcting portion evaluation value D3 is large, it can be said that the relevant pixel is most likely the lip. Thus, the correcting portion evaluation value D3 of each pixel indicates the likelihood of the relevant pixel being the lip. The lip likelihood identification unit 42 identifies the gloss correction region for performing the correction of gloss (luminance) in the lip region. The lip likelihood identification unit 42 identifies the region (pixel), in which value of the correcting portion evaluation value D3 is greater than a predetermined threshold value, as the gloss correction region (second region) to be performed with the gloss (luminance) correction.

In order to perform the gloss correction of natural appearance, the correction is performed so that the luminance becomes greater for the area (region) of one part that is most likely the lip and that is light in the gloss correction region. The luminance is increased herein with the pixel, where the product of the correcting portion evaluation value D3 and the luminance (original luminance of the pixel) becomes a maximum in the gloss correction region, as the center. To this end, the gloss image for adding the luminance of the pixel of one part of the lip region is prepared in the following processes.

The lip location weight determination unit 43 of the image correction unit 21 obtains the luminance and the correcting portion evaluation value D3 for each pixel included in the gloss correction region of the normalized mouth image. FIG.

Figure 3A:
FIG. 3($a$) is an image showing a normalized image of a mouth region, and FIG. 3($b$) is an image showing a smoothed image of the mouth region.
Figure 3B:
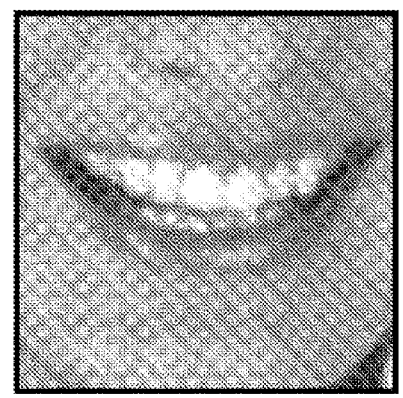
Figure 22:
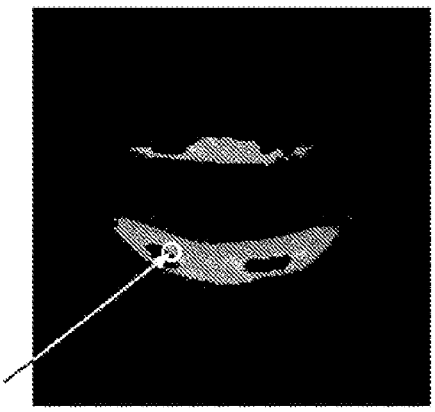
FIG. 22 corresponds to FIG. 3($b$), and is an image showing the product of the luminance and the correcting portion evaluation value D3.

22 corresponds to FIG. 3(b), and is an image showing the product of the luminance and the correcting portion evaluation value D3. The light area indicates that the product of the luminance and the correcting portion evaluation value D3 is large, and the dark area indicates that the product of the luminance and the correcting portion evaluation value D3 is small. The location that is not the gloss correction region is shown dark. The lip location weight determination unit 43 determines a concentric location weight (first weight) having the pixel, where the product of the luminance and the correcting portion evaluation value D3 is the maximum, as the center (S23). The concentric location weight becomes smaller the greater the distance from the center, the center being one. In FIG. 22, the pixel where the product of the luminance and the correcting portion evaluation value D3 is the maximum is located at the center of the circle shown in the figure.

The lip correction degree determination unit 44 of the image correction unit 21 obtains the product of the luminance, the correcting portion evaluation value D3, and the concentric location weight for each pixel of the gloss correction region, and assumes the same as the input luminance for the correction tone curve.

Figure 23:
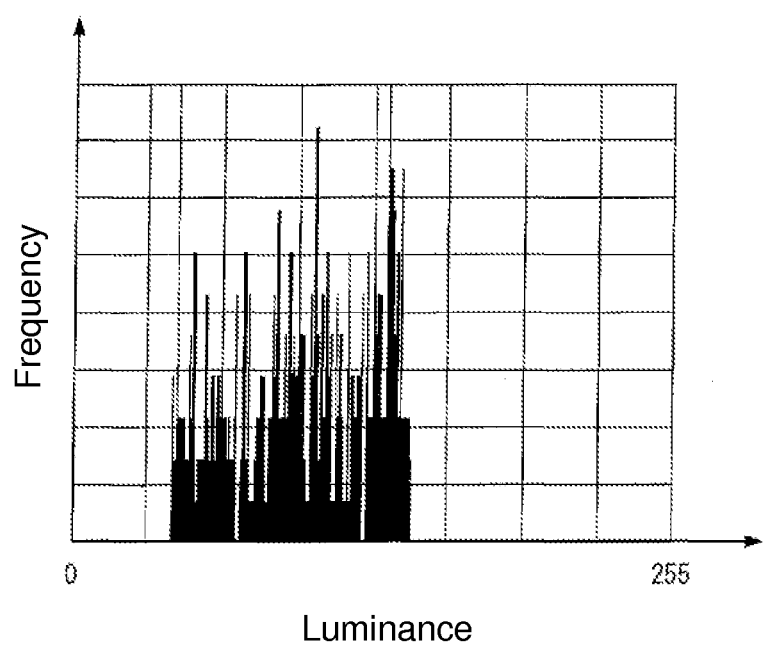
FIG. 23 is a histogram obtained by a first correction degree of a gloss correction region.

FIG. 23 is a histogram obtained by the input luminance of the gloss correction region. The lip correction degree determination unit 44 obtains the first correction degree corresponding to the input luminance for each pixel of the gloss correction region, and also obtains the second correction degree corresponding to the input luminance for the pixel of a predetermined percentage from the top in which the value of the input luminance is large (S24). This process will be described below.

Figure 24A:
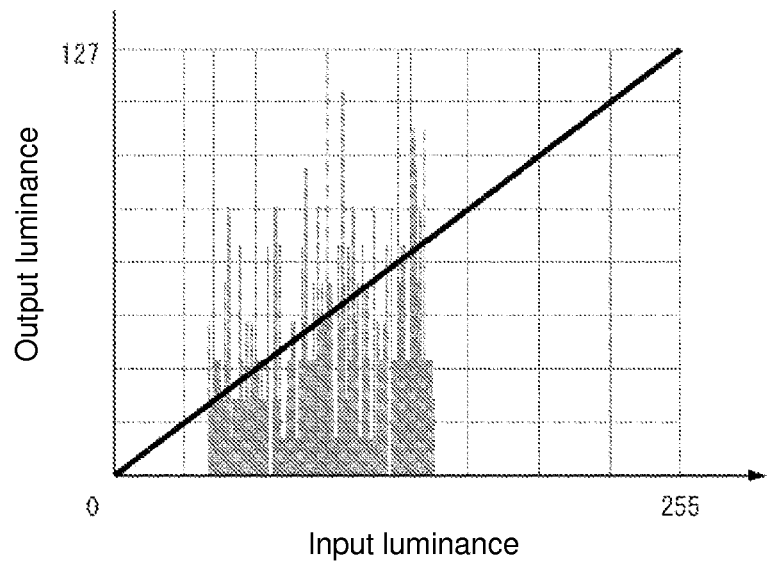
FIG. 24($a$) is a view showing a first tone curve with respect to an input luminance of each pixel, and FIG. 24($b$) is a view showing a second tone curve with respect to the input luminance of each pixel.
Figure 24B:
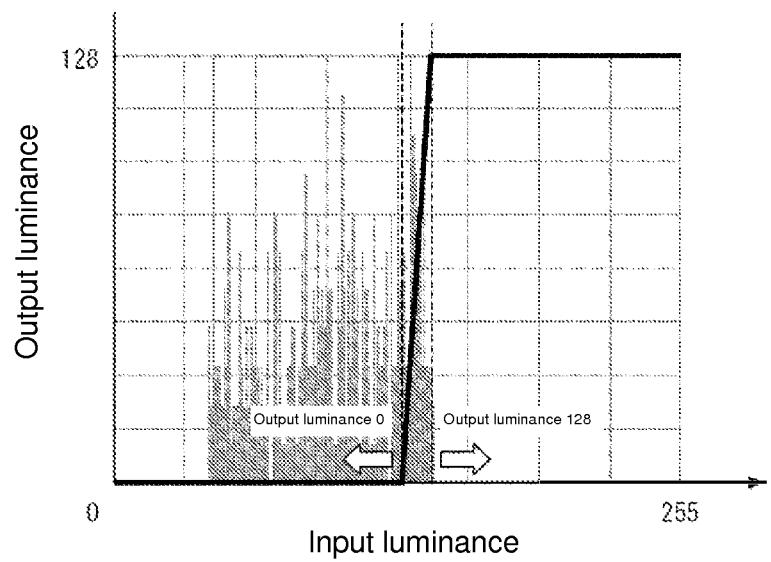

FIG. 24(a) is a view showing a first tone curve with respect to the input luminance of each pixel, and FIG. 24(b) is a view showing a second tone curve with respect to the input luminance of each pixel. The horizontal axis in FIG. 24(a) and FIG. 24(b) shows the input luminance and the vertical axis shows the output luminance by the tone curve, where the histogram of FIG. 23 is displayed in an overlapping manner for reference. The luminance value is a value between 0 and 255. In the first tone curve, the output luminance is linearly changed with respect to the input luminance value of each pixel such that the maximum input luminance 255 becomes the maximum output luminance 127. The output luminance by the first tone curve becomes the first correction degree.

In the second tone curve, the output luminance with respect to the highest input luminance becomes 128, and the output luminance of all the pixels excluding the top 4% of the input luminance value becomes 0 with respect to the input luminance value of each pixel. In the second tone curve, the output luminance linearly changes from 0 to 128 according to the input luminance value for the pixels of top 4% of the input luminance value. The output luminance by the second tone curve becomes the second correction degree.

The lip correction degree determination unit 44 obtains the first correction degree proportional to the input luminance using the first tone curve. The lip correction degree determination unit 44 obtains the second correction degree corresponding to the input luminance for the pixels in which the input luminance is the top 4% using the second tone curve.

Figure 25:
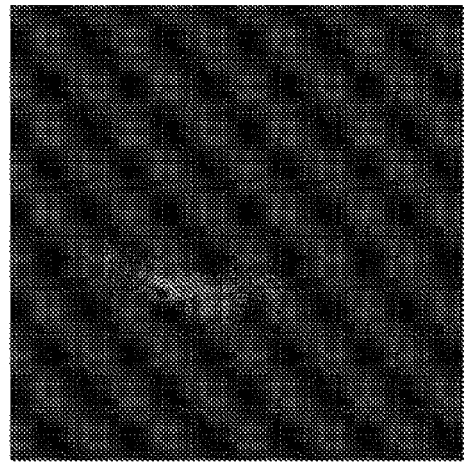
FIG. 25 corresponds to FIG. 22, and is an image showing a gloss image having only the luminance component.

The lip correction degree determination unit 44 generates the gloss image based on the first correction degree and the second correction degree of each pixel (S25). FIG. 25 corresponds to FIG. 22, and is an image showing the gloss image having only the luminance component. The luminance value of each pixel of the gloss image is obtained by multiplying a predetermined correction extent (e.g., 0.1) to the sum of the first correction degree and the second correction degree (maximum value is 255) of each pixel. The maximum luminance of the gloss image is, for example, about 25 due to the predetermined correction extent. The luminance value of the gloss image becomes the correction value of the luminance with respect to the mouth image.

Figure 26:
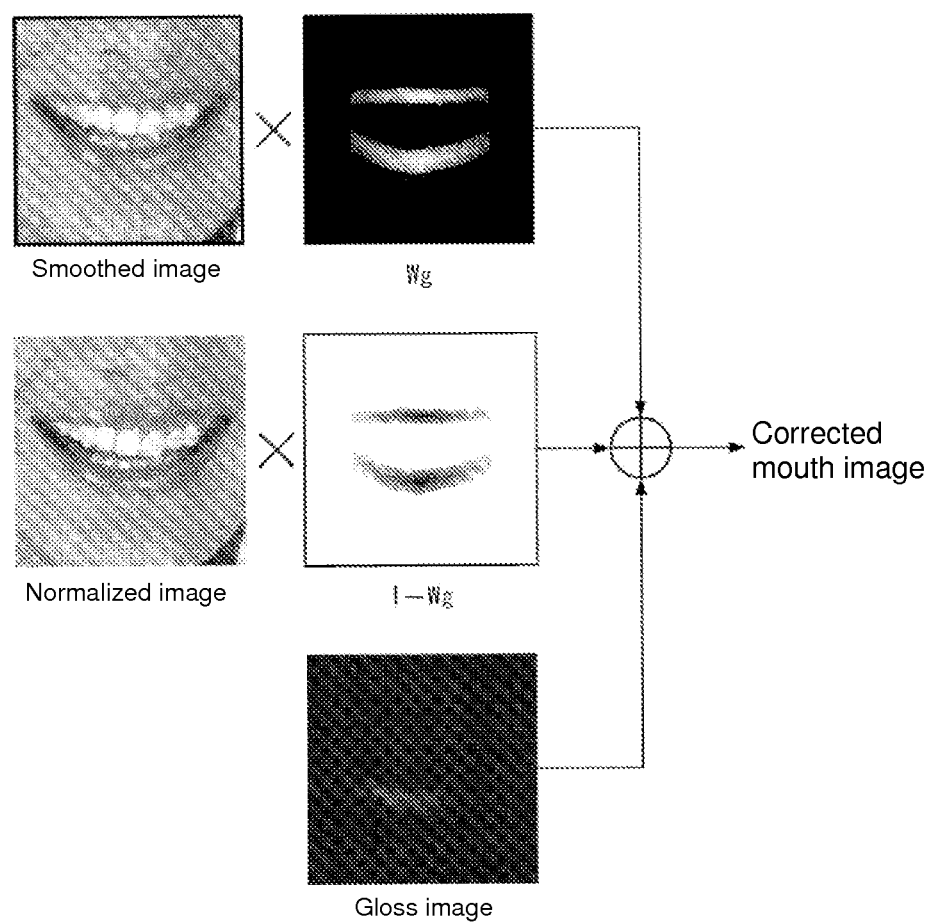
FIG. 26 is a view showing a synthesizing process of the normalized mouth image, the smoothed mouth image, and the gloss image.

The lip image correction unit 45 of the image correction unit 21 synthesizes the normalized mouth image shown in FIG. 3(a), the smoothed mouth image shown in FIG. 3(b), and the gloss image shown in FIG. 25 for the luminance value of each pixel to generate the corrected mouth image (S26). In other words, the lip image correction unit 45 increases the luminance of each pixel according to the first correction degree and the second correction degree. Specifically, the lip image correction unit 45 assumes the sum of the result of multiplying the correction weight Wg shown in FIG. 20 to the luminance of the smoothed mouth image (FIG. 3(b)), the result of multiplying the weight (1−Wg) to the luminance value of the normalized mouth image (FIG. 3(a)), and the luminance value of the gloss image (FIG. 25) as the luminance value of the corrected mouth image. FIG. 26 is a view showing the synthesizing process of the normalized mouth image, the smoothed mouth image, and the gloss image. The luminance value Yc of each pixel of the corrected mouth image is obtained with the following equation.

[Equation 9]

$$Yc = Wg \times Yf + (1-Wg) \times Yn + Yg \qquad (9)$$

Here, Yf indicates the pixel value of the pixel of the smoothed mouth image, Yn indicates the pixel value of the pixel of the normalized mouth image, and Yg indicates the pixel value of the pixel of the gloss image. The correction weight Wg takes a value between 0 and 1. If the luminance value Yc, which is the result of the addition, exceeds the maximum luminance 255, the luminance value of such pixel is set to 255. The change in luminance of the lip region is smoothed by synthesizing the mouth image smoothed for the lip region, and the gloss of the lip region can be enhanced by synthesizing the gloss image to the lip region. The lip image correction unit 45 does not perform the correction for the hue and the chroma.

The synthesizing unit 22 returns the corrected mouth image to the original size before the normalization (corrected mouth image is rotated and enlarged/reduced, as necessary), synthesizes the same to the image (facial image) to be processed, and generates the corrected image (S27). The image in which the appearance of the lip, and the like in the image to be processed is corrected is thereby obtained.

Figure 27A:
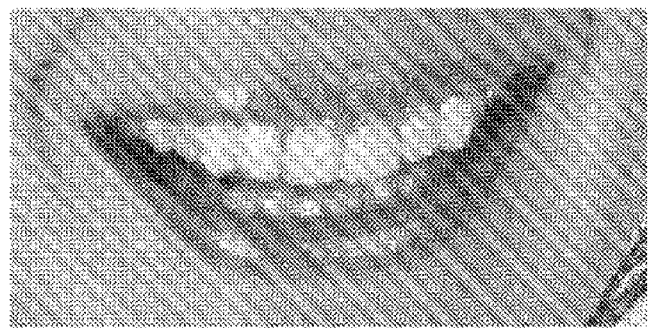
FIG. 27($a$) is an image showing a part of the facial image before the correction, and FIG. 27($b$) is an image showing a part of the facial image after the correction.
Figure 27B:
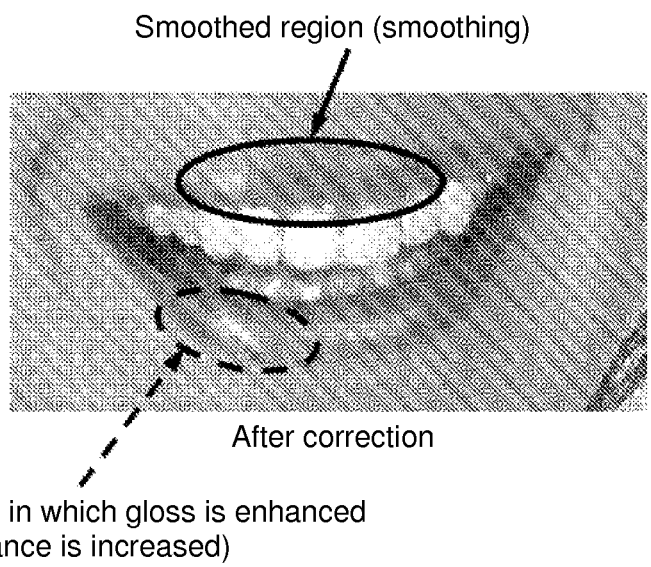

FIG. 27(a) is an image showing a part of the facial image before the correction, and FIG. 27(b) is an image showing a part of the facial image after the correction. It can be seen that the appearance of the entire upper and lower lips is smooth, and the gloss of a part of the lower lip is enhanced. In FIG. 27(b), the correction of the whitening process of the teeth, to be hereinafter described, is also applied.

The display control unit 23 causes the display device 5 to display the correction processed image, and terminates the correction process.

<Summary of Lip Correction>

According to the image processing device 31 of the embodiment, the representative color of the lip, which may take various colors, is identified based on the information on the hue and the chroma excluding the luminance of the mouth image including the lip and the skin, and the lip region can be accurately identified based on the identified representative color of the lip. An appropriate correction process can be performed on the person's lip in the image by performing the correction process on the identified lip region.

In the conventional image processing, it is assumed that the region of the lip is to be detected using the information of the luminance. This originates from the fact that there is an advantage of detecting the region of the lip based on the luminance. The reasons therefor include the following.

Firstly, the method based on the luminance can also be applied to the gray scale image.

Figure 28A:
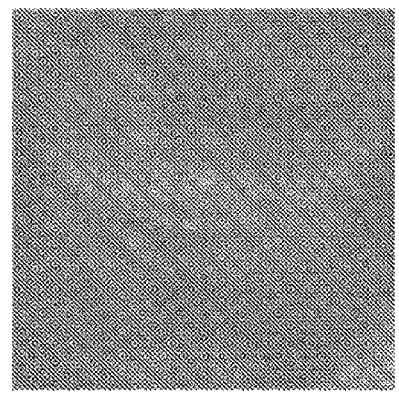
FIG. 28($a$) corresponds to FIG. 3($a$) and is an image showing the value of the Cb component of the normalized mouth image, and FIG. 28($b$) corresponds to FIG. 3($a$) and is an image showing the value of the Cr component of the normalized mouth image.
Figure 28B:
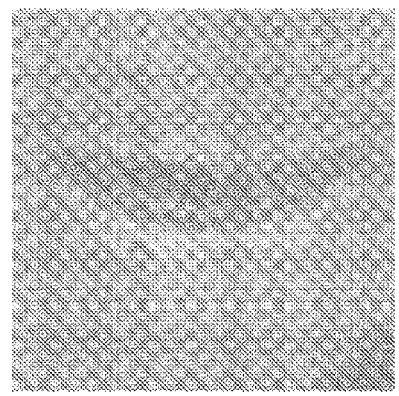

Secondly, the Y component of the mouth image generally has a clear edge compared to the Cb component and the Cr component, and thus the edge of the lip, and the like can be easily detected by using the Y component. FIG. 28(a) corresponds to FIG. 3(a) and is an image showing the value of the Cb component of the normalized mouth image, and FIG. 28(b) corresponds to FIG. 3(a) and is an image showing the value of the Cr component of the normalized mouth image. The light area indicates that the value of each component is large. Comparing FIG. 28(a) and FIG. 28(b), which show the CbCr components, and FIG. 3(a), which shows the luminance Y, the edge of the lip can be more clearly distinguished in the image showing the luminance Y.

Thus, in the prior art, the region of the lip and the color of the lip can be identified based on the luminance if the illumination condition, and the like are satisfactory. If the illumination condition, and the like are not satisfactory (if shadow is partially formed, if the illumination is too strong, etc.), on the other hand, error detection frequently occurs when the region of the lip and the color of the lip are identified based on the luminance as in the prior art and the region of the lip and the color of the lip may not be accurately identified.

Identifying the region of the lip by hue or chroma is conventionally carried out when color (hue, etc.) of the lip is known. As opposed to detecting the color of the skin distributed in a wide range of the face with a general method, it is often difficult to detect the color of the narrow region in the face such as the lip through a similar method.

On the contrary, according to the image processing device 31 of the embodiment, the representative color of the lip can be identified and the region of the lip can be identified when the color of the lip is not known and the region of the lip is not known. The image processing device 31 identifies the candidate color different (large difference) from the color of the skin and the color of the teeth as the representative color of the lip according to the difference in hue and chroma. Thus, even when the skin and the lip in the image have the same hue due to shadow, illumination, makeup, or the like, and even when the color of the skin in the image greatly differs depending on the region, the skin and teeth as well as the lip can be accurately distinguished, and the representative color of the lip can be identified. Furthermore, since the extent of each candidate color being the color of the lip is obtained in view of the variance, and the like of the color of the skin, a more appropriate lip color extent can be obtained. The difference in hue and chroma refers to the difference in hue-chroma plane (CbCr plane) of the two colors, and includes the difference in hue, the difference in chroma, the distance in the hue-chroma plane, and the like.

The image processing device 31 selects a plurality of candidate colors according to the difference by hue and chroma with the color of the skin, and selects the candidate color that is more likely the color of the lip (e.g., having large chroma) from the candidate colors as the representative color of the lip. Thus, the representative color of the lip can be more accurately identified.

The image processing device 31 identifies the region similar to the representative color of the lip as the lip region according to the difference in hue and chroma of the representative color of the lip and each pixel. In the case of the image photographed under a relatively bright illumination environment, a part of the lip may appear whitish. The whitish shiny region of the lip has small chroma, whereas the other regions of the lip have large chroma, and thus the distance in the CbCr plane between the color of the shiny region and the other lip regions becomes large. However, since the hue also does not change in the shiny region, the shiny region can also be accurately determined as the lip region by taking the hue into consideration. Even if the skin and the lip have the same hue, the lip region can be accurately identified by taking the distance in the CbCr plane between the representative color of the lip and each pixel into consideration.

The image processing device 31 applies a predetermined lip shape model, and the like based on the spatial distribution of the pixel (pixel of the lip candidate region) similar to the representative color of the lip, and identifies the pixel configuring the lip-like shape and/or the pixel at the lip-like location as the modeled lip region. If there is a region similar to the representative color of the lip other than the lip, only the region of the lip needs to be distinguished from the lip candidate region. Thus, the lip-shape model is adapted (fitted) to the lip candidate region to identify only the pixel at the lip-like location as the lip region from the lip candidate region. Furthermore, even if a part of the lip is not similar to the representative color of the lip due to the illumination condition, and the like, the pixel included in the lip-shape model when the lip-shape model is adapted to the lip candidate region can be identified as the lip region. Thus, even the region of the lip, in which information on hue/chroma is lost as the region glistens white at the time of photographing, can be accurately identified as the lip region.

Therefore, according to the image processing device 31 of the present embodiment, the representative color of the lip can be accurately identified and the lip region can be identified even with respect to the image photographed under adverse conditions.

Furthermore, the image processing device 31 determines the correction degree (gloss image) of the lip according to the product of the correcting portion evaluation value D3 representing lip-likeness and the location weight having a specific location (first location) as the center. Since the correction degree of the area where the likelihood of being the lip is low or the area distant from the specific location is small, the correction degree in the vicinity of the boundary of the region to perform the correction can be reduced. Thus, the correction can be appropriately (natural appearance) carried out on the region of the lip while preventing the boundary of the lip from being unnaturally emphasized.

<Image Processing Flow for Teeth Correction>

A flow of image correction process of the whitening of the teeth in the digital camera 30 will be hereinafter described. The process (process shown in FIG. 6) until identifying the lip region is similar to the case of lip correction described above.

Figure 29:
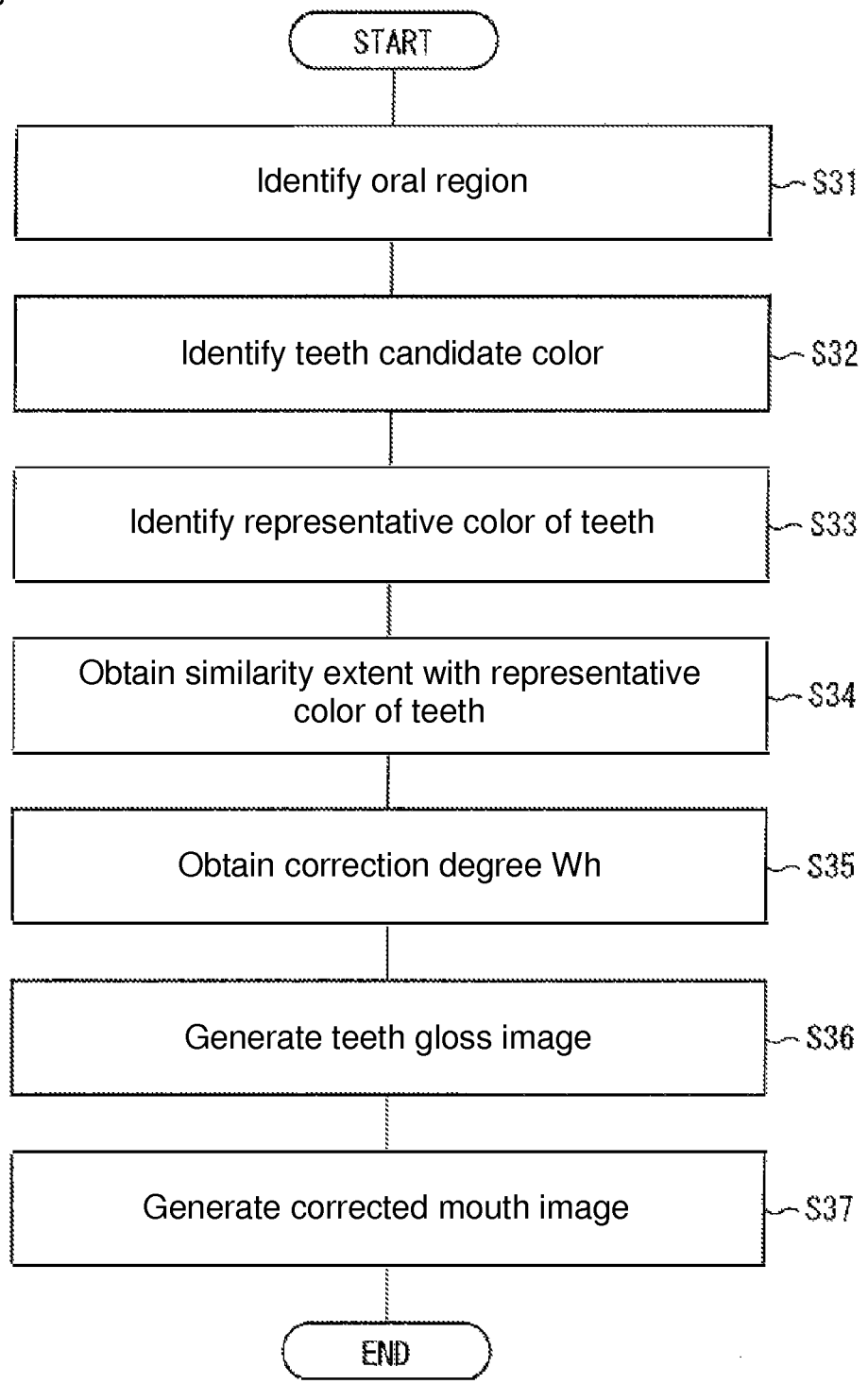
FIG. 29 is a flowchart showing a flow of oral region identification process and the correction process.

FIG. 29 is a flowchart showing a flow of oral region identification process and correction process (whitening process of teeth) in the image processing device 31. The image processing device 31 corrects the teeth in the image so as to appear glistening white by increasing the luminance of the region of the teeth.

First, the oral region identification unit 32 identifies the region between the upper lip region and the lower lip region identified by the lip region identification unit 20 as the oral region (processing target region, first region) (S31). Specifically, the region between the upper and lower lip regions shown in FIG. 17 is the oral region. It is assumed that the oral region of the mouth image includes the region of the teeth.

The teeth candidate color identification unit 33 divides at least a part of the oral region of the mouth image into a plurality of regions, and identifies the representative color of each divided region as a plurality of candidate colors (teeth candidate colors) for the color of the teeth (S32). The average color of the region is assumed as the teeth candidate color for each region.

The teeth representative color identification unit 34 compares the chroma of each teeth candidate color, and identifies the teeth candidate color having the smallest chroma as the representative color of the teeth (S33). A predetermined color (e.g., white) may be used for the representative color of the teeth.

The teeth color similarity identification unit 51 of the image correction unit 21 obtains the similarity extent of the representative color of the teeth for each pixel of the oral region (S34). Specifically, the teeth color similarity identification unit 51 obtains a teeth color similarity Wi corresponding to the distance in the color space between the color of each pixel and the representative color of the teeth. The teeth color similarity Wi represents the similarity of the color of each pixel in the oral region and the representative color of the teeth. That is, if the teeth color similarity Wi is large, this means that the relevant pixel has a large likelihood of being the tooth.

The teeth color similarity Wi corresponding to the distance in the color space can be obtained with the following equation.

[Equation 10]

$$Wi = \exp\left\{-\frac{(Yt-Y)^2 + (Cbt-Cb)^2 + (Crt-Cr)^2}{\sigma yt^2 + \sigma bt^2 + \sigma rt^2}\right\} \quad (10)$$

Figure 31:
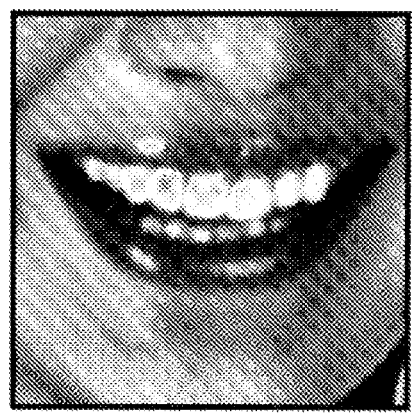
FIG. 31 corresponds to FIG. 3($b$) and is an image showing the result of calculating a teeth color similarity Wi of each pixel of the mouth image.

Here, Yt, Cbt, Crt are the luminance Y component, Cb component, and Cr component of the representative color of the teeth, respectively, and Y, Cb, and Cr are the Y component, Cb component, and Cr component of the color of each pixel. Furthermore, σyt, σbt, and σrt are the standard deviation of the color of the teeth in the Y axis of the color space, the standard deviation of the color of the teeth in the Cb axis, and the standard deviation of the color of the teeth in the Cr axis. The standard deviation of the color of the teeth can be obtained from the color of each pixel of the region (region divided by the teeth candidate color identification unit 33) corresponding to the representative color of the teeth (teeth candidate color ultimately identified as the representative color of the teeth). In the dark pixel, the hue and the chroma are small, similar to the whitish pixel of the region of the teeth. Thus, the dark pixel has low teeth color similarity Wi in view of the luminance Y when obtaining the teeth color similarity Wi. FIG. 31 corresponds to FIG. 3(b), and is an image showing the result of calculating the teeth color similarity Wi by applying the color of each pixel of the mouth image to equation (10). The light area indicates that the teeth color similarity Wi is large, and the dark area indicates that the teeth color similarity Wi is small. Accordingly, it can be seen that the region of the teeth has a large teeth color similarity Wi. The region other than the teeth of the oral region, that is, the gum, back of the mouth, tongue, and the like have small teeth color similarity Wi.

The teeth location weight determination unit 52 of the image correction unit 21 obtains a weight (correction weight Wh) for performing the image correction of the teeth with respect to each pixel location of the oral region (S35). For example, the region near the mouth end point of the oral region is often in shadow inside the mouth. Thus, the correction process for whitening the teeth is to be carried out more focused on the vicinity of the middle in the horizontal direction (direction in which the left and right mouth end points are lined) of the oral region. The image correction of a natural appearance thus can be carried out.

Figure 30:
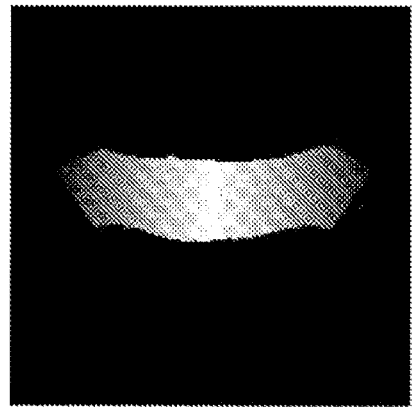
FIG. 30 corresponds to FIG. 17 and is an image showing the oral region and a correction weight Wh of the oral region.

Specifically, the teeth location weight determination unit 52 sets the correction weight Wh (first weight) so that the weight becomes greater toward the center location in the horizontal direction of the oral region, and the weight becomes smaller toward the outer side (mouth end point side) in the horizontal direction of the oral region. For example, the correction weight Wh becomes one at the location (center location in the horizontal direction) on a perpendicular bisector of a line segment connecting the left and right mouth end points of the oral region, and the correction weight Wh becomes zero at the end on the outer side in the horizontal direction of the oral region. The correction weight may be linearly changed, for example, according to the distance from the perpendicular bisector. In other words, the image correction unit 21 determines the correction weight Wh so that the correction weight Wh becomes smaller the greater the distance according to the distance from a line (perpendicular bisector of the line segment connecting the two mouth end points) passing through the center in the horizontal direction of the oral region. FIG. 30 corresponds to FIG. 17, and is an image showing the oral region and the correction weight Wh of the oral region. The light area indicates that the correction weight Wh is large.

Not limited to the description made above, the teeth location weight determination unit 52 may determine the correction weight Wh so that the correction weight Wh becomes smaller the greater the distance from the specific location (first location indicating point or line) of the oral region. For example, the teeth location weight determination unit 52 may set the barycenter or the center (e.g., center of rectangle circumscribing the oral region) of the oral region as the specific location. The teeth location weight determination unit 52 may set the location on the line passing through the barycenter or the center of the oral region as the specific location.

For example, the face in the image may not be facing front and the mouth may be slightly directed toward the side. The teeth location weight determination unit 52 may identify the direction of the face from the feature and the like of the face detected by the feature detection unit 13. Thus, the teeth location weight determination unit 52 may set the location assumed as the center of the mouth of the face (not the center of the mouth end point on the image, but the point or line on the image assumed to be representing the middle of the actual mouth) as the specific location, and may determine the correction weight Wh according to the distance from the specific location. If the face is not facing the front, a more natural correction can be carried out by increasing the correction weight Wh of the center of the actual mouth (i.e., increasing the luminance of the teeth). The known technique can be used for the method of identifying the direction of the face from the feature point of the face, and identifying the center of the actual mouth (see non-patent document 1, T. Cootes, G. Edwards, and C. Taylor, "Active appearance models", IEEE, Transactions on Pattern Analysis and Machine Intelligence, June 2001, 23(6), pp. 681-685). For example, the direction of the face (facial model) can be identified by fitting the feature points of the face to the three-dimensional facial model, and the corresponding point (point indicating the middle of the actual mouth) on the image can be identified from the feature point of the mouth of the facial model.

For example, the teeth location weight determination unit 52 may set the location (pixel) having the largest luminance in the oral region or the location (pixel) having the largest teeth color similarity Wi as the specific location, and determine the correction weight Wh according to the distance from the specific location. Alternatively, the teeth location weight determination unit 52 may set the barycenter or the center of the region in which teeth color similarity Wi is greater than a predetermined threshold value (first threshold value) in the oral region as the specific location.

In order to perform the teeth gloss correction of natural appearance, a teeth gloss image for adding the luminance of the pixel of the teeth region is prepared in the following process.

The teeth correction degree determination unit 53 of the image correction unit 21 generates the teeth gloss image based on the correction weight Wh of the oral region, the teeth color similarity Wi, the first lip color similarity We (second organ likelihood), and the second lip color similarity Wf (second organ likelihood) for the oral region (S36). Specifically, the image obtained by multiplying (1−We) and (1−Wf) to the product of the correction weight Wh and the teeth color similarity Wi of the oral region, and further multiplying a predetermined correction extent (e.g. 20) is generated as the teeth gloss image. Each pixel value of the teeth gloss image represents the correction degree of each location used in the correction.

Figure 32:
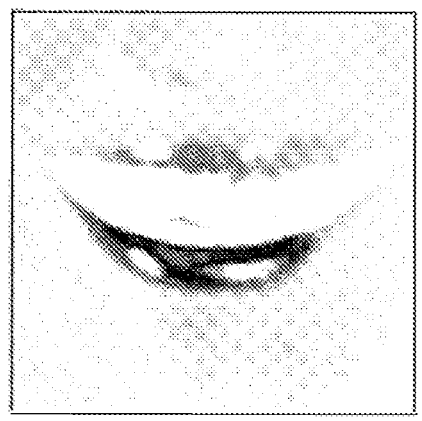
FIG. 32 corresponds to FIG. 13($b$) and is an image showing the value of (1−We) of each pixel.
Figure 33:
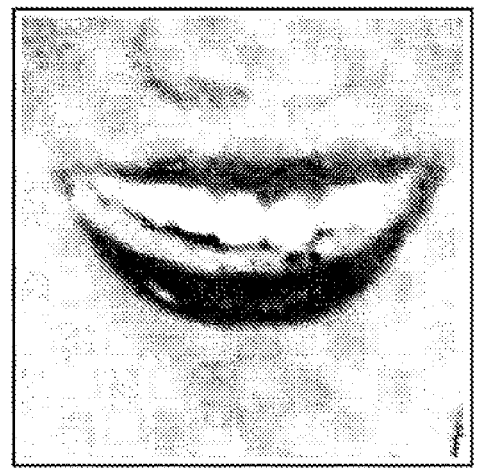
FIG. 33 corresponds to FIG. 14($b$) and is an image showing the value of (1−Wf) of each pixel.
Figure 34:
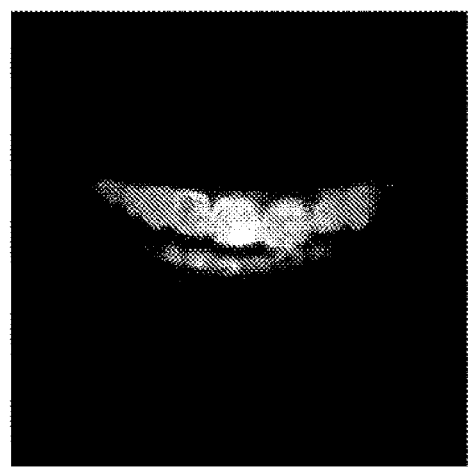
FIG. 34 corresponds to FIG. 31 and is an image showing a teeth gloss image.

FIG. 32 corresponds to FIG. 13(b), and is an image showing the value of (1−We) of each pixel. FIG. 33 corresponds to FIG. 14(b), and is an image showing the value of (1−Wf) of each pixel. FIG. 34 corresponds to FIG. 31, and is an image showing the teeth gloss image. The light area indicates that the value is large. The correction weight Wh, the teeth color similarity Wi, the first lip color similarity We, and the second lip color similarity Wf of the oral region take a value between 0 and 1. For example, if the correction extent is 20, each pixel of the teeth gloss image takes a value between 0 and 20. The value of each pixel of the teeth gloss image is the correction value (correction degree) of the luminance of when correcting the mouth image. The weight of the correction in the vicinity of the middle in the horizontal direction of the region, which is the teeth of the oral region, can be increased by obtaining the product of the correction weight Wh and the teeth color similarity Wi of the oral region. Not limited to the product of the correction weight Wh and the teeth color similarity Wi of the oral region, the correction value may be determined such that the correction degree (value of each pixel of the teeth gloss image) becomes greater the greater the correction weight Wh and the teeth color similarity Wi of the oral region.

If the teeth cannot be seen although the mouth is opened in the image, the color of the tongue, and the like might be identified as the representative color of the teeth. The color of the tongue is assumed to be relatively similar to the color of the lip. In such a case, the region (e.g., tongue) having hue/chroma similar to the lip may be prevented from being corrected by taking (1−We) and (1−Wf) into consideration so as not to correct the color of the tongue to be lighter.

The teeth image correction unit 54 of the image correction unit 21 synthesizes the normalized mouth image shown in FIG. 3(a) and the teeth gloss image shown in FIG. 34 for the luminance value of each pixel to generate the corrected mouth image (S37). Specifically, the teeth image correction unit 54 adopts the sum of the luminance value of the normalized mouth image (FIG. 3(a)) and the luminance value of the teeth gloss image (FIG. 34) as the luminance value of the corrected mouth image for each pixel. If the luminance value, which is the result of the addition, exceeds the maximum luminance 255, the luminance value of such pixel is set to 255. Each pixel value of the teeth gloss image can be said as the correction value of the luminance. In the embodiment, the correction of increasing the luminance according to the correction degree is carried out for the whitening correction process of the teeth, but for example, the specific color may be synthesized according to the correction degree or the specific color may be enhanced (value of chroma of specific hue may be increased).

The synthesizing unit 22 synthesizes the corrected mouth image to the image to be processed (facial image). The subsequent process is similar to the case of the lip correction described above.

Comparing FIG. 27(a) and FIG. 27(b), it can be seen that the luminance of the region at the middle in the horizontal direction of the teeth, in particular, is increased in the image showing a part of the facial image after the correction shown in FIG. 27(b).

<Summary of Teeth Correction>

According to the image processing device 31 of the present embodiment, the oral region can be accurately identified based on the lip region. An appropriate correction process can be performed on the person's teeth in the image by performing the correction process on the region having a large extent of being the tooth in the oral region. The correction degree of the luminance at the boundary of the oral region in the vicinity of the mouth end point can be reduced by changing the correction weight Wh according to the distance from the specific location (middle in the horizontal direction) of the oral region. Thus, the correction can be appropriately (natural appearance) carried out on the region of the teeth while preventing the boundary of the oral region from being unnaturally emphasized.

In the teeth gloss image shown in FIG. 34, the light area indicates the area where the extent of being the tooth is large. Thus, the teeth gloss image can be said as showing the region of the teeth. Therefore, according to the embodiment, the region of the teeth can be accurately identified. The image processing device 31 may include a teeth region identification unit for identifying the region, in which the pixel value of the teeth gloss image is greater than or equal to a predetermined threshold value, as the region of the teeth.

(Variant)

An image processing device according to one aspect of at least one embodiment of the present invention relates to an image processing device for performing image processing on a facial image including a mouth of a person, the image processing device comprising a first organ likelihood identification unit configured to identify, based on a difference between a color of a location and a first representative color which is a representative color of an organ to be processed, a likelihood of the location being the organ as a first organ likelihood for each location of a first region including at least a part of the mouth of the facial image; a first weight determination unit configured to determine a first weight so that the first weight becomes smaller the greater a distance from a first location of the first region for each location of the first region; a correction degree determination unit configured to determine a correction degree of the location so that the correction degree becomes greater the greater the first organ likelihood and the first weight; and an image correction unit configured to correct an image using the correction degree.

An image processing method according to another aspect of at least one embodiment of the present invention relates to an image processing method for a facial image including a mouth of a person, the image processing method including steps of identifying, based on a difference between a color of a location and a first representative color which is a representative color of an organ to be processed, a likelihood of the location being the organ as a first organ likelihood for each location of a first region including at least a part of the mouth of the facial image; determining a first weight so that the first weight becomes smaller the greater a distance from a first location of the first region for each location of the first region; determining a correction degree of the location so that the correction degree becomes greater the greater the first organ likelihood and the first weight; and correcting an image using the correction degree.

According to the configuration described above, the correction degree at the relevant location becomes greater the greater the first organ likelihood and the first weight at each location of the first region. The extent of the location being the organ to be processed is assumed to be large if the first organ likelihood is large. Therefore, the correction degree of the location assumed to be the organ to be processed and close to the first location is made large, and the correction degree of the location that is not the organ to be processed or the location distant from the first location is made small. The region of the organ to be processed at the location close to the first location is mainly corrected, and the correction degree in the vicinity of the boundary distant from the first location of the first region is made small. Thus, the correction can be appropriately carried out on the region of the organ to be processed while preventing the boundary of the first region from being unnaturally enhanced.

The organ to be processed may be a lip or teeth, for example.

The correction degree may be proportional to the product of the first organ likelihood and the first weight.

The first organ likelihood identification unit may identify the first organ likelihood according to a distance between the first representative color and the color of each location of the first region in a hue-chroma plane of the color space.

The first organ likelihood identification unit may identify the first organ likelihood according to the distance between the first representative color and the color of each location of the first region and the difference in hue between the first representative color and the color of the location in the hue-chroma plane of the color space.

The first organ likelihood identification unit may identify the first organ likelihood according to a distance between the first representative color and the color of each location of the first region in the color space.

The first location indicates the line in the first region, and the first weight determination unit may be configured to determine the first weight so that the first weight becomes smaller the greater the distance from the line indicated by the first location.

The first location may indicate a line passing through the barycenter or the center of the first region.

According to the configuration described above, the correction degree of the barycenter or the center of the first region may be set large and the correction degree of the end away therefrom may be set small. For example, the teeth seen in the mouth often are in the shadow of the lip in the region close to the mouth end point. Thus, a more natural correction can be carried out by increasing the correction degree of the teeth close to the barycenter or the center of the processing target region.

The line indicated by the first location may be perpendicular to a line connecting the two mouth end points.

According to the configuration described above, the vicinity of the center of the mouth is mainly corrected so that a more natural correction can be carried out.

The first location indicates a point in the first region, and the first weight determination unit may be configured to determine the first weight so that the first weight becomes smaller the greater the distance from the point indicated by the first location.

The first weight determination unit may be configured to have the location where the product of the first organ likelihood and the luminance is the largest in the first region as the first location.

The first location may indicate the barycenter or the center of the first region.

The first location may be the barycenter or the center of the region in which the first organ likelihood is greater than or equal to the first threshold value in the first region.

According to the configuration described above, the correction degree of the barycenter or the center of the region assumed to be the lip or the teeth can be increased, for example. Thus, a more natural correction can be carried out.

The first location may indicate a center location of the actual mouth corresponding to the face direction of the person in the facial image.

According to the configuration described above, the correction degree of the center of the actual mouth can be increased if the face is not facing the front. Thus, a more natural correction can be carried out.

The image correction unit may greatly increase the luminance of the corresponding location of the first region the greater the correction degree.

According to the configuration described above, for example, the teeth of the facial image can be corrected to be white having a natural appearance. For example, the gloss of the lip can be increased with a natural appearance.

The correction degree determination unit may be configured to determine the correction degree so that the correction degree becomes greater the greater the first organ likelihood, the first weight, and the luminance for each location of the first region.

The image correction unit may correct the image of a correction region using the correction value, the correction region being a second region in which the first organ likelihood is greater than or equal to a second threshold value.

The image processing device may further include a second organ likelihood identification unit configured to identify a second organ likelihood of the location based on a difference between the color of the location and a second representative color, which is the representative color of anther organ that is not to be processed, for each location of the first region, where the correction degree determination unit is configured to determine the correction degree so that the correction degree becomes greater the greater the first organ likelihood and the first weight, and the correction degree becomes greater the smaller the second organ likelihood.

According to the configuration described above, the correction degree of a region assumed to be another organ that is not the processing target can be reduced. Thus, for example, the region of the lip, gum, or tongue existing at the periphery of the region of the teeth can be prevented from being corrected, and the region of the teeth can be appropriately corrected.

Assuming the organ to be processed is the lip, and the point on the perpendicular bisector of the line segment connecting the left and right mouth end points and on the inner side of the first region as the second location, the image processing device comprises a second weight determination unit configured to determine a second weight such that the second weight becomes a maximum at the second location and the second weight becomes a minimum at at least one part of the boundary of the first region for each location of the first region, where the first organ likelihood identification unit may be configured to reduce the first organ likelihood the smaller the second weight for each location of the first region.

According to the configuration described above, the correction degree can be set large for the central location of the lip, and the correction degree can be set small for the vicinity of the boundary of the lip. Thus, the correction can be appropriately carried out on the lip region while preventing the boundary of the lip region from being unnaturally emphasized.

The image processing device may be partially realized with a computer, in which case, a control program for realizing the image processing device with the computer by operating the computer as each unit described above, and a non-transitory computer readable recording medium recorded with the control program are also encompassed within the scope of the present invention.

Lastly, each block of the image processing device 31, in particular the image acquisition unit 11, the face detection unit 12, the feature detection unit 13, the appropriateness determination unit 14, the mouth image normalization unit 15, the smoothing unit 16, the skin representative color identification unit 17, the candidate color identification unit 18, the lip representative color identification unit 19, the lip region identification unit 20, the image correction unit 21, the synthesizing unit 22, the display control unit 23, the oral region identification unit 32, the teeth candidate color identification unit 33, the teeth representative color identification unit 34, the teeth color similarity identification unit 51, the teeth location weight determination unit 52, the teeth correction degree determination unit 53, and the teeth image correction unit 54 may be configured by hardware logic, or may be realized by software using the CPU (Central Processing Unit) in the following manner.

In other words, the image processing device 31 includes a CPU for executing a command of the control program for realizing each function, a ROM (Read Only Memory) stored with the program, a RAM (Random Access Memory) for developing the program, a storage device (recording medium) such as a memory for storing the program and the various types of data, and the like. The object of at least one embodiment of the present invention can be achieved by providing to the image processing device 31, a recording medium, in which the program code (executable format program, intermediate code program, source program) of the control program of the image processing device 31, which is the software for realizing the functions described above, is computer readably recorded, and having the computer (or CPU or MPU (microprocessor unit)) read out and execute the program code recorded on the recording medium.

The recording medium may be, for example, a tape series such as a magnetic tape and a cassette tape, a disc series such as a magnetic disc including a floppy (registered trademark) disc/hard disc and an optical disc including a CD-ROM (compact disc read-only memory)/MO (magneto-optical)/MD (Mini Disc)/DVD (digital versatile disk)/CD-R (CD recordable), a card series such as an IC card (include memory card)/optical card, a semiconductor memory series such as a mask ROM/EPROM (erasable programmable read-only memory)/EEPROM (electrically erasable and programmable read-only memory)/flash ROM, and the like.

The image processing device 31 may be configured to be connectable with the communication network, and the program code may be provided through the communication network. The communication network is not particularly limited, and for example, Internet, Intranet, Extranet, LAN (local area network), ISDN (integrated services digital network), VAN (value-added network), CATV (community antenna television) communication network, virtual private network, telephone line network, mobile communication network, satellite communication network, and the like may be used. A transmission medium configuring the communication network is not particularly limited, and for example, wired line such as IEEE (institute of electrical and electronic engineers) 1394, USB, power line carrier, cable TV line, telephone line, ADSL (asynchronous digital subscriber loop) line, and the like, infrared light such as IrDA (infrared data association) and remote controller, or wireless line such as Bluetooth (registered trademark), 802.11 wireless, HDR (high data rate), portable telephone line, satellite line, terrestrial digital network, and the like can be used.

The present invention is not limited to the embodiment described above, and various changes can be made within a scope defined by the Claims. In other words, embodiments obtained by combining technical means appropriately changed within the scope defined by the Claims are also encompassed within the technical scope of the present invention.

Industrial Applicability

The present invention can be applied to a digital camera, and the like including the image processing device.

The invention claimed is:

1. An image processing device for performing image processing on a facial image including a mouth of a person, the image processing device comprising:
   a central processing unit configured to control the image processing device to function as:
   a first organ likelihood identification unit configured to identify, based on a difference between a color of a location and a first representative color which is a representative color of an organ to be processed, a likelihood of the location being the organ, as a first organ likelihood for each location of a first region including at least a part of the mouth of the facial image;
   a first weight determination unit configured to determine a first weight, the first weight becoming smaller, the greater a distance from a first location of the first region for each location of the first region;
   a correction degree determination unit configured to determine a correction degree of the location, the correction degree becoming greater, the greater the first organ likelihood and the first weight become; and
   an image correction unit configured to correct an image using the correction degree.

2. The image processing device according to claim 1, wherein the correction degree is proportional to a product of the first organ likelihood and the first weight.

3. The image processing device according to claim 1, wherein the first organ likelihood identification unit identifies the first organ likelihood according to a distance between the first representative color and the color of each location of the first region in a hue-chroma plane of a color space.

4. The image processing device according to claim 1, wherein the first organ likelihood identification unit identifies the first organ likelihood according to a distance between the first representative color and the color of each location of the first region and a difference in hue between the first representative color and the color of the location in a hue-chroma plane of a color space.

5. The image processing device according to claim 1, wherein first organ likelihood identification unit identifies the first organ likelihood according to a distance between the first representative color and the color of each location of the first region in a color space.

6. The image processing device according to claim 1, wherein the first location indicates a line in the first region, and the first weight determination unit determines the first weight, the first weight becoming smaller, the greater a distance from the line indicated by the first location becomes.

7. The image processing device according to claim 6, wherein the first location indicates a line passing a barycenter or a center of the first region.

8. The image processing device according to claim 6, wherein the line indicated by the first location is perpendicular to a line connecting two mouth end points.

9. The image processing device according to claim 6, wherein the first location indicates a center location of an actual mouth corresponding to the face direction of the person in the facial image.

10. The image processing device according to claim 1, wherein the first location indicates a point in the first region, and the first weight determination unit determines the first weight, the first weight becoming smaller, the greater a distance from the point indicated by the first location becomes.

11. The image processing device according to claim 10, wherein the first location indicates a barycenter or a center of the first region.

12. The image processing device according to claim 10, wherein the first location indicates a barycenter or a center of a region where the first organ likelihood is greater than or equal to a first threshold value in the first region.

13. The image processing device according to claim 1, wherein the first weight determination unit is configured to have a location where a product of the first organ likelihood and a luminance is the largest in the first region as the first location.

14. The image processing device according to claim 1, wherein the image correction unit greatly increases a luminance of the corresponding location of the first region the greater the correction degree.

15. The image processing device according to claim 1, wherein the correction degree determination unit determines the correction degree, the correction degree becoming greater, the greater the first organ likelihood, the first weight, and a luminance for each location of the first region become.

16. The image processing device according to claim 1, wherein the image correction unit corrects the image of a correction region using the correction degree, the correction region being a second region in which the first organ likelihood is greater than or equal to a second threshold value.

17. The image processing device according to claim 1, the image processing device being controlled by the central processing unit to function as:
a second organ likelihood identification unit configured to identify a second organ likelihood of the location based on a difference between the color of the location and a second representative color which is the representative color of another organ that is not to be processed, for each location of the first region;
wherein the correction degree determination unit determines the correction degree, the correction degree becoming greater, the greater the first organ likelihood and the first weight becomes and the correction degree becomes greater the smaller the second organ likelihood becomes.

18. The image processing device according to claim 1, wherein the organ to be processed is a lip, and a point on a perpendicular bisector of a line segment connecting left and right mouth end points and on an inner side of the first region is a second location, the image processing device being controlled by the central processing unit to function as:
a second weight determination unit configured to determine a second weight such that the second weight becomes a maximum at the second location and the second weight becomes a minimum at least one part of a boundary of the first region for each location of the first region;
wherein the first organ likelihood identification unit reduces the first organ likelihood the smaller the second weight for each location of the first region.

19. An image processing method for a facial image including a mouth of a person, the image processing method comprising:
identifying, based on a difference between a color of the location and a first representative color which is a representative color of an organ to be processed, a likelihood of a location being the organ as a first organ likelihood for each location of a first region including at least a part of the mouth of the facial image;
determining a first weight, the first weight becoming smaller, the greater a distance from a first location of the first region for each location of the first region becomes;
determining a correction degree of the location, the correction degree becoming greater, the greater the first organ likelihood and the first weight become; and
correcting an image using the correction degree.

20. A non-transitory computer readable medium storing a control program of an image processing device for performing image processing on a facial image including a mouth of a person, the control program causing a computer to:
identify, based on a difference between a color of the location and a first representative color which is a representative color of an organ to be processed, a likelihood of a location being the organ as a first organ likelihood for each location of a first region including at least a part of the mouth of the facial image;
determine a first weight, the first weight becoming smaller, the greater a distance from a first location of the first region for each location of the first region becomes;
determine a correction degree of the location, the correction degree becoming greater, the greater the first organ likelihood and the first weight become; and
correct an image using the correction degree.

* * * * *